United States Patent
Martin et al.

(10) Patent No.: US 11,216,201 B2
(45) Date of Patent: Jan. 4, 2022

(54) CACHING AND DATA PROMOTION TECHNIQUES

(71) Applicant: EMC IP Holding Company LLC, Hopkinton, MA (US)

(72) Inventors: Owen Martin, Hopedale, MA (US); Vladimir Desyatov, Hollis, NH (US); Mark D. Moreau, Grafton, MA (US); Dustin H. Zentz, Northborough, MA (US); Anoop Raghunathan, Ashland, MA (US); Sean B. Reilly, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 16/883,215

(22) Filed: May 26, 2020

(65) Prior Publication Data
US 2021/0373788 A1   Dec. 2, 2021

(51) Int. Cl.
*G06F 3/06* (2006.01)

(52) U.S. Cl.
CPC .......... *G06F 3/0644* (2013.01); *G06F 3/0604* (2013.01); *G06F 3/0646* (2013.01); *G06F 3/0653* (2013.01); *G06F 3/0688* (2013.01)

(58) Field of Classification Search
CPC .... G06F 3/0604; G06F 3/0613; G06F 3/0644; G06F 3/0646; G06F 3/0647; G06F 3/0653; G06F 3/0685; G06F 3/0688; G06F 3/0689

USPC .......... 711/117, 118, 151, 154, 156
See application file for complete search history.

(56) References Cited

U.S. PATENT DOCUMENTS

| | | | |
|---|---|---|---|
| 7,949,637 B1 | 5/2011 | Burke | |
| 8,583,838 B1* | 11/2013 | Marshak | G06F 3/061 710/18 |
| 9,152,349 B2 | 10/2015 | Yochai | |
| 2018/0024867 A1* | 1/2018 | Gilsdorf | H03M 7/4081 709/226 |
| 2020/0293219 A1* | 9/2020 | Szczepanik | G06F 3/0683 |
| 2021/0064272 A1* | 3/2021 | Patel | G06F 3/0647 |

* cited by examiner

*Primary Examiner* — Gary J Portka
(74) *Attorney, Agent, or Firm* — Muirhead and Saturnelli, LLC

(57) ABSTRACT

Techniques for performing data movements may include tracking sets of I/O statistics for a extents, wherein each of the sets of I/O statistics characterizes I/O operations directed to a corresponding one of the extents having data stored on a first storage tier of first non-volatile storage devices; determining, in accordance with the sets of I/O statistics, a list that includes one or more of the extents qualified for promotion from the first storage tier to a second storage tier, wherein the second storage tier includes second non-volatile storage devices have a higher performance ranking that the first non-volatile storage devices of the first storage tier; selecting, from the list, a first extent to be promoted from the first storage tier to the second storage tier; and performing first processing that promotes only cached data of the first extent from the first storage tier to the second storage tier.

20 Claims, 16 Drawing Sheets

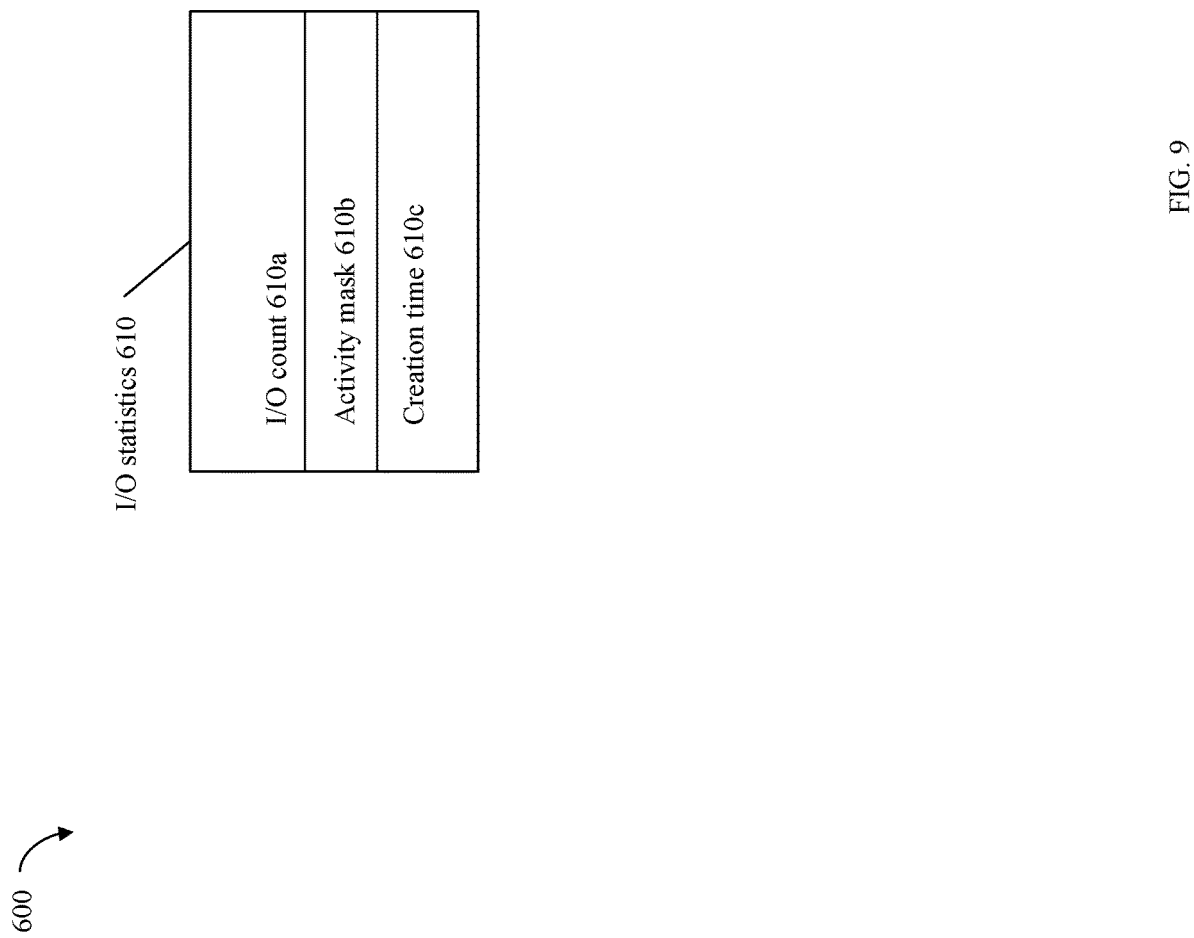

CACHING AND DATA PROMOTION TECHNIQUES

BACKGROUND

Technical Field

This application generally relates to data storage.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for performing data movements comprising: tracking a plurality of sets of I/O statistics for a plurality of extents, wherein each of the plurality of sets of I/O statistics characterizes I/O operations directed to a corresponding one of the plurality of extents having data stored on a first storage tier of first non-volatile storage devices; determining, in accordance with the plurality of sets of I/O statistics, a list that includes one or more of the plurality of extents qualified for promotion from the first storage tier to a second storage tier, wherein the second storage tier includes second non-volatile storage devices have a higher performance ranking that the first non-volatile storage devices of the first storage tier; selecting, from the list, a first extent to be promoted from the first storage tier to the second storage tier; and performing first processing that promotes only cached data of the first extent from the first storage tier to the second storage tier.

In at least one embodiment, the first processing may include: determining that a plurality of data portions of the first extent are currently stored in the cache; copying the plurality of data portions from the cache to target physical storage location in the second storage tier; and updating mapping information that maps a plurality of logical addresses of the plurality of data portions to the target physical storage location in the second storage tier. The first processing may include determining that a first data portion of the first extent is not currently stored in the cache; and not promoting the first data portion from the first tier to the second tier. The list of extents may include at least two extents and processing may include sorting the list of extents in accordance with a score associated with each of the at least two extents on the list, wherein said sorting may generate a ranked list of extents sorted in decreasing order of scores associated with extents on the list. The first extent selected in may have a highest score of all extents on the list. Each extent on the list may be qualified extent that has been determined in accordance with a heuristic as having a non-sequential access pattern. The heuristic may determine that said each extent has a non-sequential access pattern in accordance with one of the plurality of sets of I/O statistics associated with said each extent. Each extent on the list may have an associated score determined in accordance with one of the plurality of sets of I/O statistics associated with said each extent. Each of the plurality of extents may be partitioned into a same number of data portions. Each of the plurality of sets of I/O statistics associated with one of the plurality of extents may include an I/O count denoting a number of I/O operations that have been directed to said one extent, an activity mask that includes a bit for each data portion of said each extent, and a creation time denoting an earliest time at which data of said each extent is stored in the cache.

In at least one embodiment, processing may include: receiving an I/O operation directed to the first extent, wherein the I/O operation reads or writes data to a target logical address mapped to the first extent; and updating a first set of the plurality of sets of I/O statistics corresponding to the first extent, wherein said updating includes incrementing the I/O count of the first set and setting a first bit of the activity mask corresponding to the target logical address.

In at least one embodiment, the second storage tier may include a plurality of non-volatile storage devices of storage class memory (SCM). The first storage tier may include a plurality of non-volatile storage devices that are rotating drives. The first storage tier may include a plurality of non-volatile storage devices that are solid state drives. A cache that caches the cached data of the first extent may have a higher performance ranking than the second storage tier of SCM storage devices. Each of the plurality of extents may map to a logical address range of a logical device and wherein, prior to performing said first processing, data of first logical address range mapped to the first extent may be stored on physical storage of the first tier and, after performing said first processing, data of the first logical address range mapped to the first extent may be stored on other physical storage of the second tier.

BRIEF DESCRIPTION OF THE DRAWINGS

Features and advantages of the techniques herein will become more apparent from the following detailed description of exemplary embodiments thereof taken in conjunction with the accompanying drawings in which:

FIG. 9 illustrates I/O statistics that may be tracked for an extent having at least some of its data cached in an embodiment in accordance with the techniques herein.

DETAILED DESCRIPTION OF EMBODIMENT(S)

Figure 1:
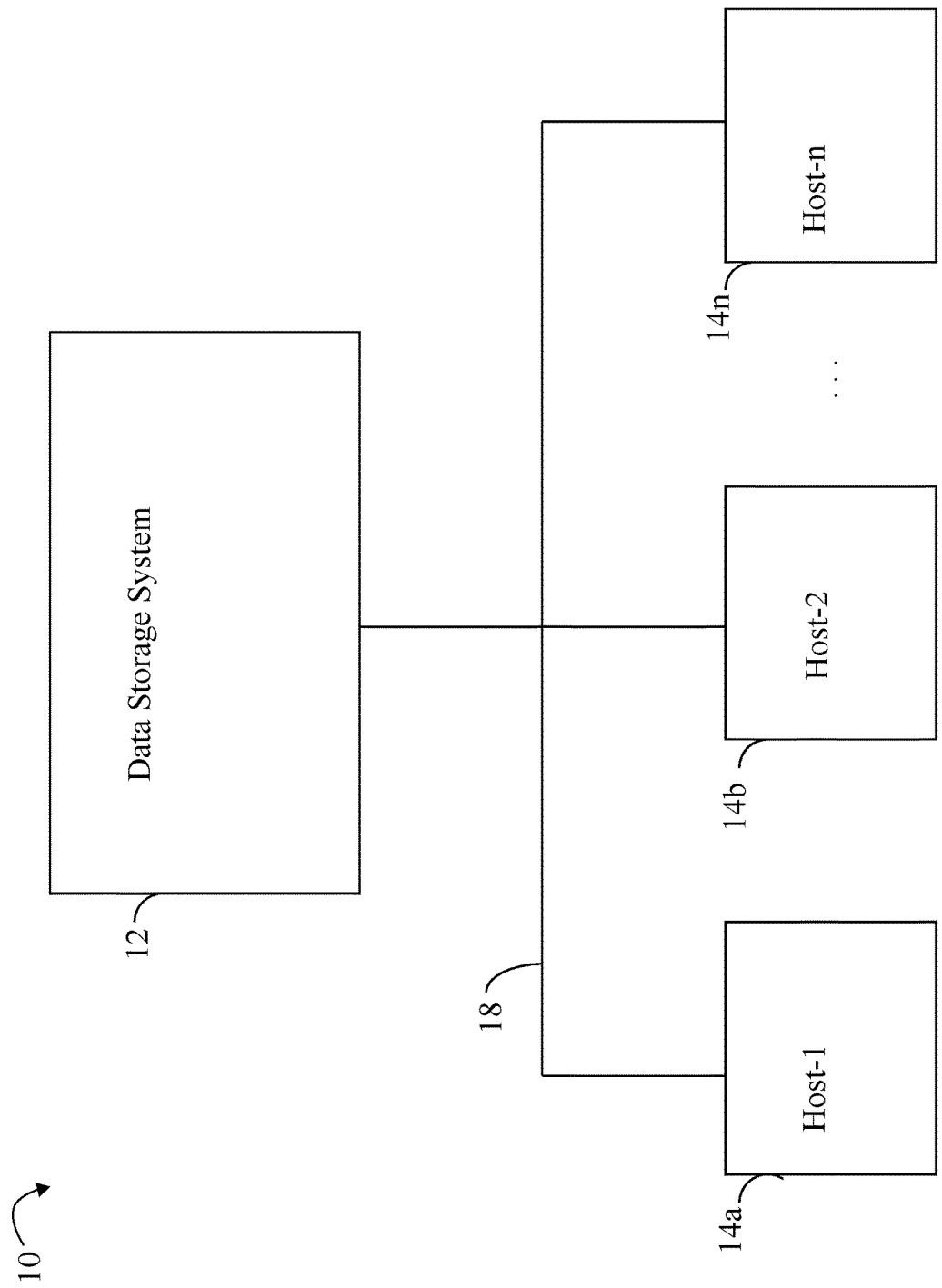
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
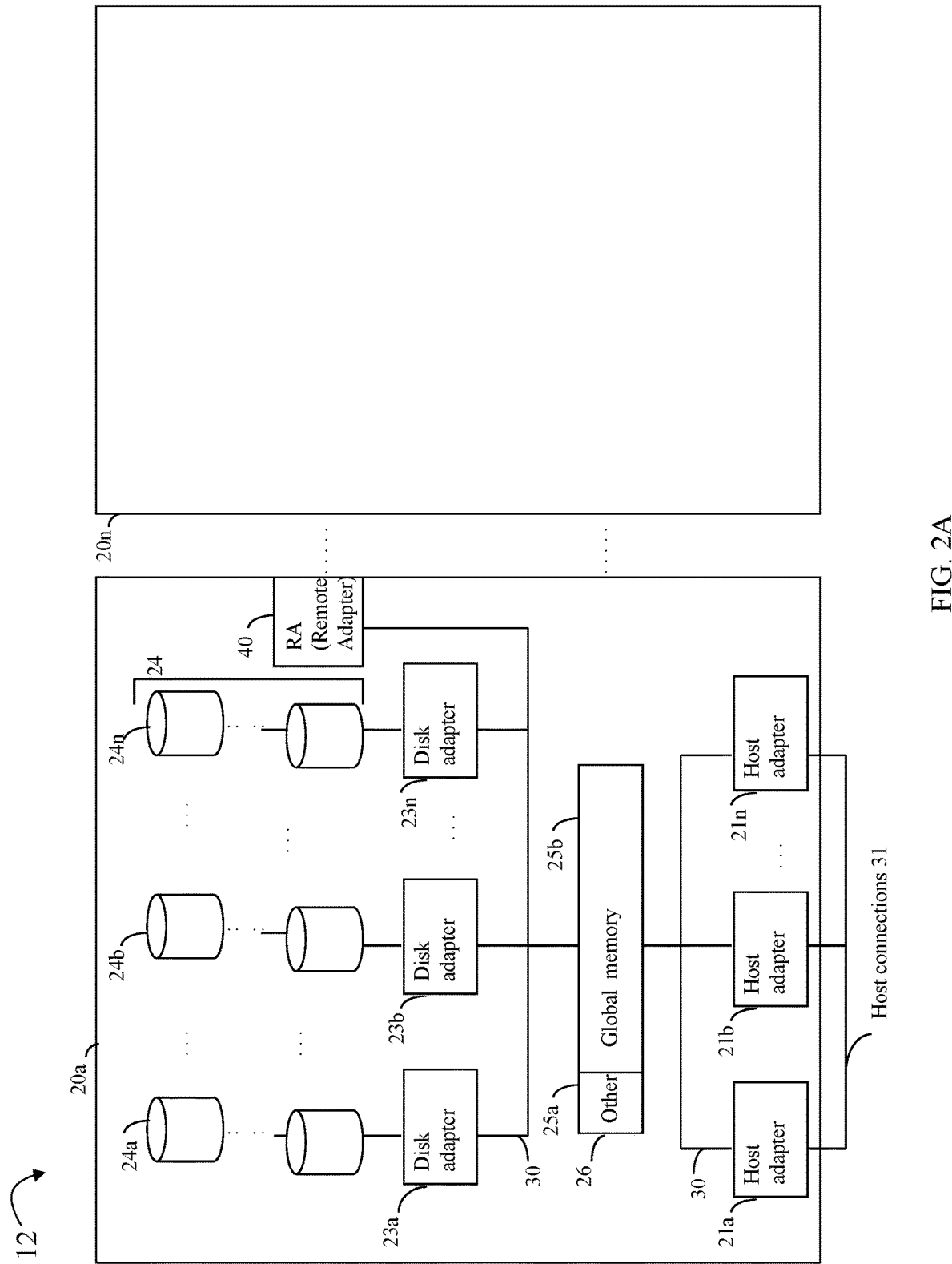
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like. An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices. In at least one embodiment, the data storage system may include one or more types of non-volatile SSDs used as back-end non-volatile storage devices, such as flash and storage class memory (SCM) physical storage devices.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage such as logical devices which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN. With a thin LUN, the physical storage for the LUN may be allocated in chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUN and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

It should be noted that although the techniques described herein may be used with thin LUNs providing virtual storage provisioning, the techniques herein may also be used in connection with other types of suitable logical devices, such as regular or thick LUN, not providing virtual provisioning.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (e.g., the PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
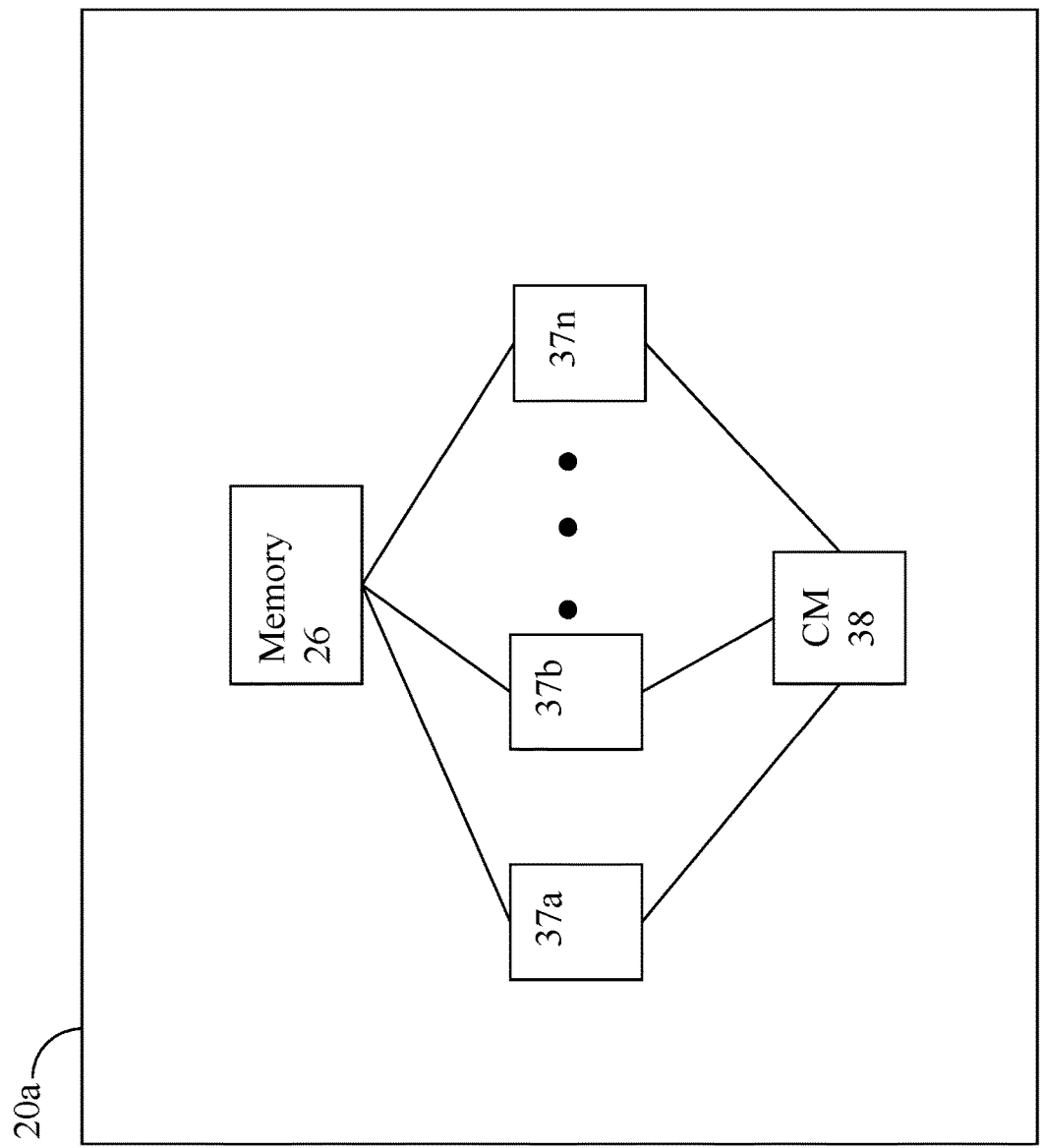
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX (multiplexer)/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as the HAs, the DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from the data storage management software, such as a data storage system management application, executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Data storage systems may include different storage tiers having different types of non-volatile storage media. For example, consistent with other description herein, in at least one embodiment, the data storage system may include one or more tiers of rotating disk drives and include a tier of a particular type of SSD drives (e.g., flash-based storage drives or non-volatile SCM drives). Data portions of LUNs may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on, for example, the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data. For example, in at least one embodiment, the SSD tiers may include a first tier of non-volatile SCM drives and a second tier of flash drives.

In an embodiment in accordance with the techniques herein, each storage tier may include PDs of a particular media type or technology (e.g., non-volatile SCM drives, MLC flash drives, SLC flash drives, 10K RPM drives, 15K RPM drives, 7.2K RPM drives) configured into one or more RAID groups having an associated RAID protection type or level and configuration. Thus, a physical storage location or allocation within a storage tier may be characterized as having a first dimension denoting the media type or technology of the PDs in the storage tier and a second dimension denoting the RAID type or level (e.g., RAID-1, RAID-5, RAID-6) and configuration (e.g., of the RAID group such as RAID-5 with 3×1 (3 data drives and 1 parity drive) or 7×1 (7 data drives and 1 parity drive). In at least one embodiment, all PDs in the same tier may be configured into one or more RAID groups where each such RAID group of the same tier has the same RAID level and configuration.

In connection with performing I/O operations, such as writes as well as reads, a data storage system in an embodiment in accordance with the techniques herein may use a cache in order to improve performance.

Figure 3:
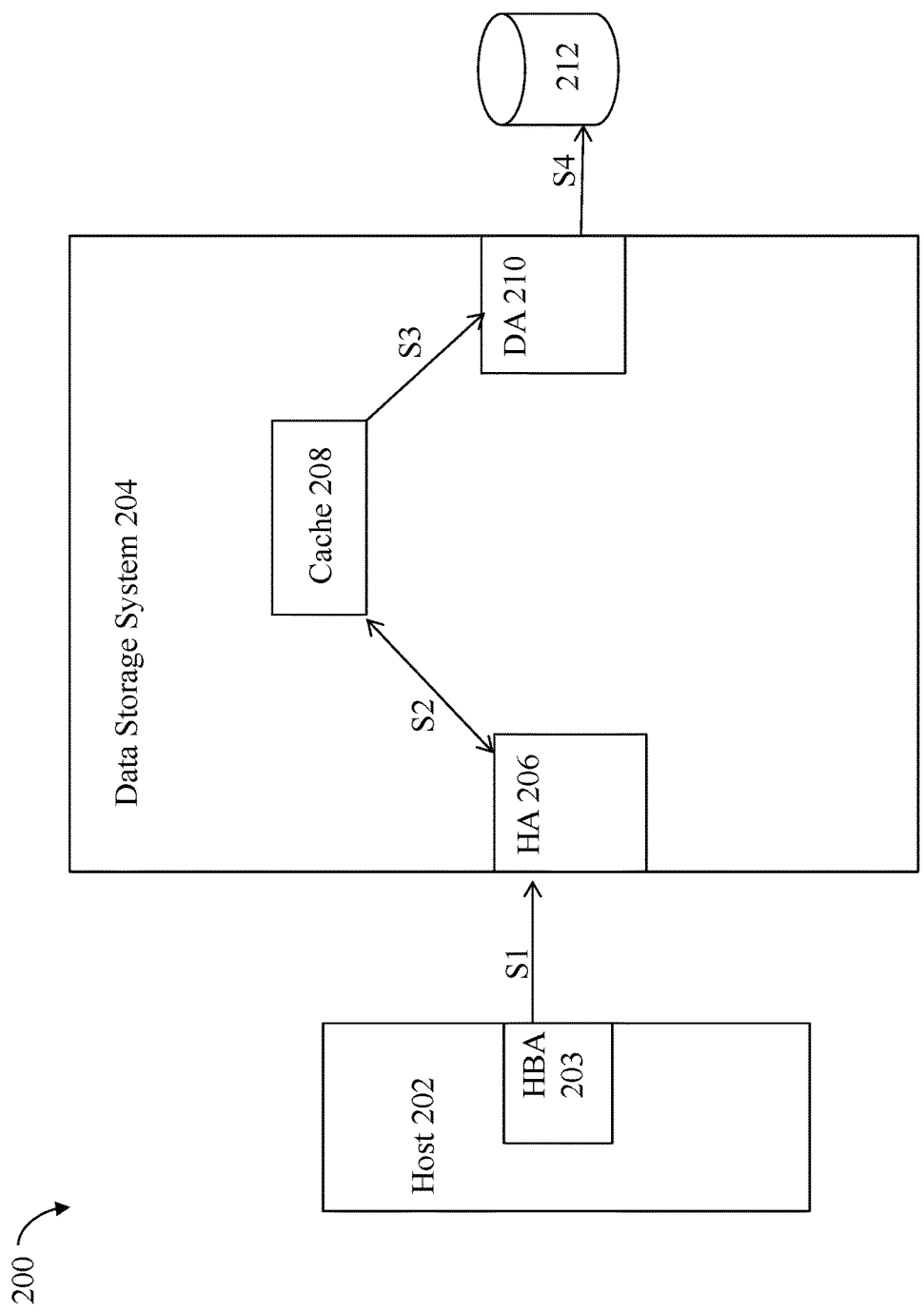
FIGS. 3 and 4 are examples illustrating processing that may be performed in connection servicing I/O operations on the data storage system in an embodiment in accordance with the techniques herein.

Referring to FIG. 3, shown is an example illustrating processing of a write I/O operation received at the data storage system in an embodiment in accordance with the techniques herein, whereby a host may issue the write operation. The example 200 includes the host 202 and the data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes the DA 210, the cache 208 and the physical storage device 212, such as a disk drive. Generally, the host 202 and the data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with the techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs, described is write operation processing as illustrated in FIG. 3.

In the step S1, the host 202 may issue a write request over a port of its HBA 203 where the write request is received by the HA 206 of the data storage system 204. In the step S2, the HA 206 may store the write operation data in the cache 208 and mark the cache slot or cache location as write pending (WP) thereby denoting the cache slot includes write data that needs to be written to physical storage. In some embodiments, the data storage system may return a response to the host indicating that the write operation has been completed successfully following the step S2 once the write data has been stored in the cache 208. Once the write data has been stored in the cache 208 in the step S2, processing may be performed at some time later to destage the write data from the cache 208 to the physical drive 212. Thus, in the step S3, the DA 210 may obtain the write data from the cache 208 and then store the write data in the step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4.

Figure 4:
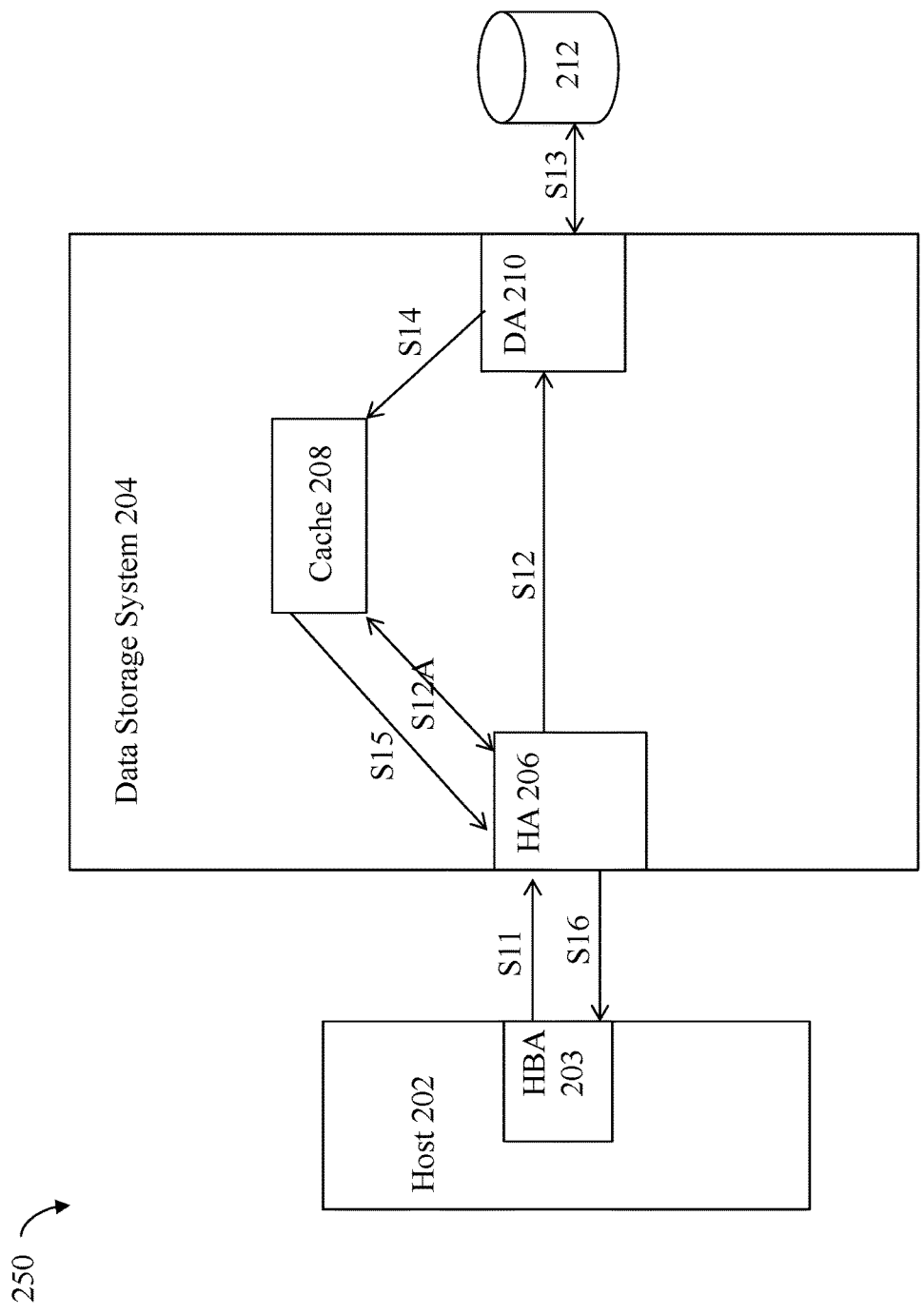

Referring to FIG. 4, shown is an example illustrating processing of a read I/O operation received at the data storage system, in an embodiment in accordance with the techniques herein, whereby a host may issue the read operation. The example 250 includes the host 202, the data storage system 204, and other components similarly numbered and as described elsewhere herein.

As the first step S11, the host 202 sends the read request to the data storage system 204. The read request may be received by the HA 206. The HA 206 determines whether all the requested read data is in the cache 208 thereby indicating that the read request is a read hit, or otherwise, that the read request is a read miss. If the read request is a read hit indicating that the read request may be serviced using data already in cache 208, the HA 206 retrieves the read request data from the cache 208 in the step S12A and returns the requested read data to the host 202 in the step S16. Alternatively, if the read request is a read miss, processing may be performed to retrieve the data from the physical storage, store the requested read data in the cache, and then return the cached read data to the host. In connection with read miss processing, the HA 206 may request S12 that a back-end component, such as the DA 210, retrieve the requested data from the physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from the physical storage device 212 in the step S13. The DA 210 may store the read data in the cache 208 in the step S14. The HA 206 may then retrieve the read data in the step S5 from the cache 208 and then return the requested read data (as retrieved from cache) to the host 202 in the step S16.

Requests to read and/or write data, such as for I/O operations received by an HA of the data storage system from the host, identify a location of where data is read from or written to, where such location may be expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

In at least one embodiment, the size of a track or block of data stored on a LUN may be 128K bytes. An embodiment may store additional information for each track of data stored in the cache. For example, for a particular LUN and an LBA, such additional information may map the particular LUN and the LBA to a cache location containing the data for that LUN and the LBA. Such additional information may also, for example, map a particular PD and a PD offset to a cache location containing the data for that PD and the PD offset. Generally, such additional information may be stored in any suitable location and used, for example, by the HA, DA and other data storage system components and executing code, as an index to map into the data cache 310 to retrieve and/or store data from the cache. For example, the HA may manage and/or use information mapping a LUN and an LBA to a cache location including data stored at the LBA on the particular LUN. The DA may manage and/or use information mapping a PD and an offset on the PD to a cache location including the data stored at the offset on the particular PD.

Figure 5:
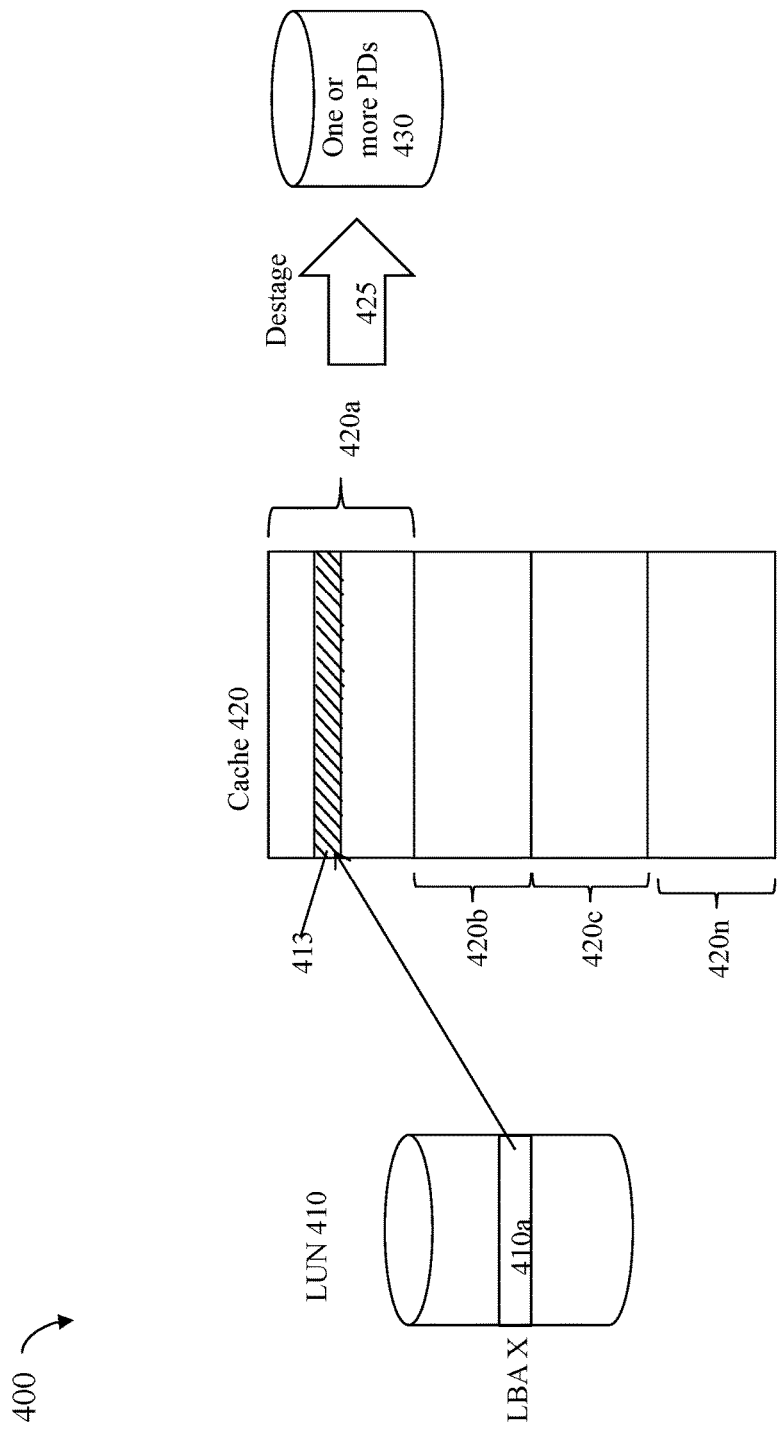
FIGS. 5 and 8 are examples illustrating use of a data cache in an embodiment in accordance with the techniques herein.

Referring to FIG. 5, shown is an example illustrating different views of cached data in an embodiment in accordance with the techniques herein. The example 400 includes the LUN 410, the cache 420 and one or more PDs 430. The cache 420 may include the cache pages 420a-n, where each cache page may include multiple cache slots or locations with cached tracks of data. The cache 420 may be a data cache similar to that as described elsewhere herein (e.g., the element 208 of FIGS. 3 and 4). An HA may receive a write operation to store write data at a LUN offset or LBA X of the LUN 410. The element 410a may denote the write data written to the LBA X of LUN 410. The HA may write the data 410a to the cache location 413 included in the cache page 420a of the cache 420, where the cache location 413 may be marked as containing WP data. The foregoing use and mapping of the LBAs of the LUN 410 to locations of the cache 420 may be characterized as the HA or front end component view where the HA uses logical addresses of data storage locations expressed in terms of LUNs and LBAs.

At a later point in time after the write data 410a is placed in the cache at location 413, a DA may destage 425 the data from the cache page 420a to the one or more PDs 430. For destaging, the DA may operate on single cache pages destaging data of the single cache page 420a. The foregoing use and mapping of cache locations to PD locations may be characterized as the DA or backend component view, where the DA uses data storage locations expressed in terms of PDs and PD locations.

In at least one embodiment, each cache page may include data stored at logically contiguous sequential LBA locations (e.g., each cache page corresponds or maps to a contiguous, consecutive LBA range of a LUN). For example, assuming a cache page size of 64 tracks, cache page 420a may include data stored on the tracks 0-63 of the LUN 410.

Although only a single LUN is illustrated, there may be I/Os directed to many different LUNs whereby destaging may include generally destaging cached WP data of one or more LUNs.

Figure 6:
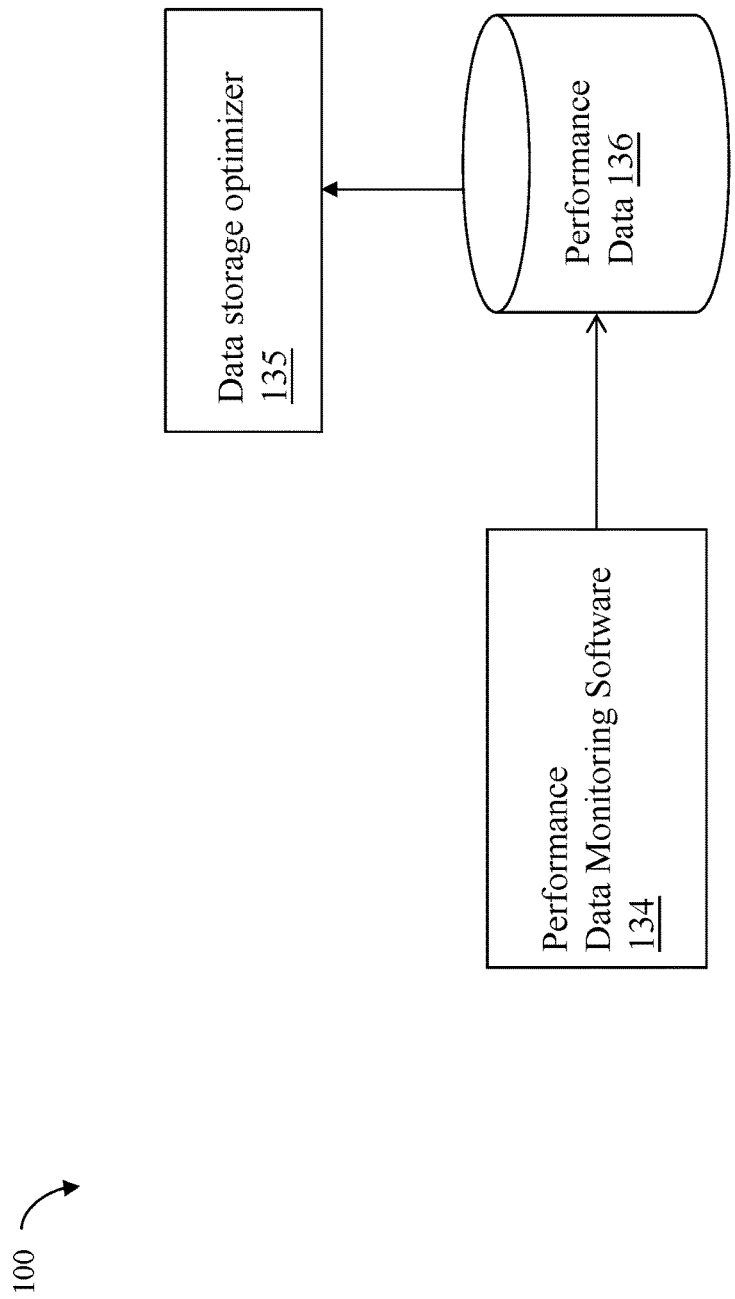
FIG. 6 is an example of components that may be included in an embodiment in accordance with the techniques herein.

Referring to FIG. 6, shown is an example 100 of components that may be used in an embodiment in connection with the techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations that are sent from a host to the data storage system, where such I/O operations are directed to LUNs. For example, the performance data 136 may be used by the data storage optimizer 135 in an embodiment in accordance with the techniques herein. The performance data 136 may be used in determining and/or optimizing one or more statistics or metrics such as may be related to, for example, an I/O workload for one or more PDs, a pool or group of PDs, logical devices or volumes (e.g., thin or thick LUNs), and the like. The I/O workload may also be a measurement or level of "how busy" a device is, for example, in terms of I/O operations (e.g., I/O throughput such as number of I/Os/second, response time (RT), and the like).

It should be noted that the operations of read and write with respect to a LUN, thin device, and the like, may be viewed as read and write requests or commands from a back-end I/O perspective or a front-end I/O perspective. In connection with a back-end I/O perspective, the backend (BE) I/O workload may be based on I/Os from a DA that, as described herein, may be controller or other backend PD interface. Thus, these BE workload I/O operations are operations that may also be characterized as a number of operations with respect to the PD (e.g., number of physical device reads, writes, and the like, based on physical device accesses). This is in contrast to a front-end I/O perspective, for example, in connection with observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA to retrieve data from the PD only if there is a read cache miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, in at least one embodiment, observed data that is used by the data storage optimizer and gathered to determine workload, such as observed numbers of reads and writes, may refer to the back-end perspective read and write requests or commands performed by the DA. Such read and write commands may correspond, respectively, to physical device accesses such as disk reads and writes that may result from a host I/O request received by an HA 21.

The optimizer 135 may perform processing to determine how to allocate or partition physical storage of the PDs in a multi-tiered environment for use by multiple applications. The optimizer 135 may also perform other processing such as, for example, to determine what particular portions of LUNs to store on PDs of a particular tier, evaluate when to move data between different storage tiers, and the like. It should be noted that the optimizer 135 may generally represent one or more components that perform processing as described herein as well as one or more other optimizations and other processing that may be performed in an embodiment.

In at least one embodiment of a data storage system in accordance with the techniques herein, a data storage optimizer may perform processing to optimize I/O performance and use of the different storage tiers. In such an embodiment, the data storage optimizer may perform processing including transparently automating the control, placement, and movement of data between different storage tiers as well as movement of data portions between PDs in the same tier.

In at least one embodiment, the logical address space of LUN may be partitioned into multiple logical address space portions, where each such portion denotes a sub-LUN portion that maps to a subrange of less than the entire logical address space of the LUN. The size of each data portion, sometimes referred to a slice or chunk, mapped to one of the logical address space portions may correspond to the data movement granularity size that may vary with embodiment. The data storage optimizer may perform data movements of data portions each having the data movement granularity size. Also depending on embodiment, each of the data portions moved or placed by the optimizer may have the same size or may be of different supported data movement granularity sizes.

Figure 7:
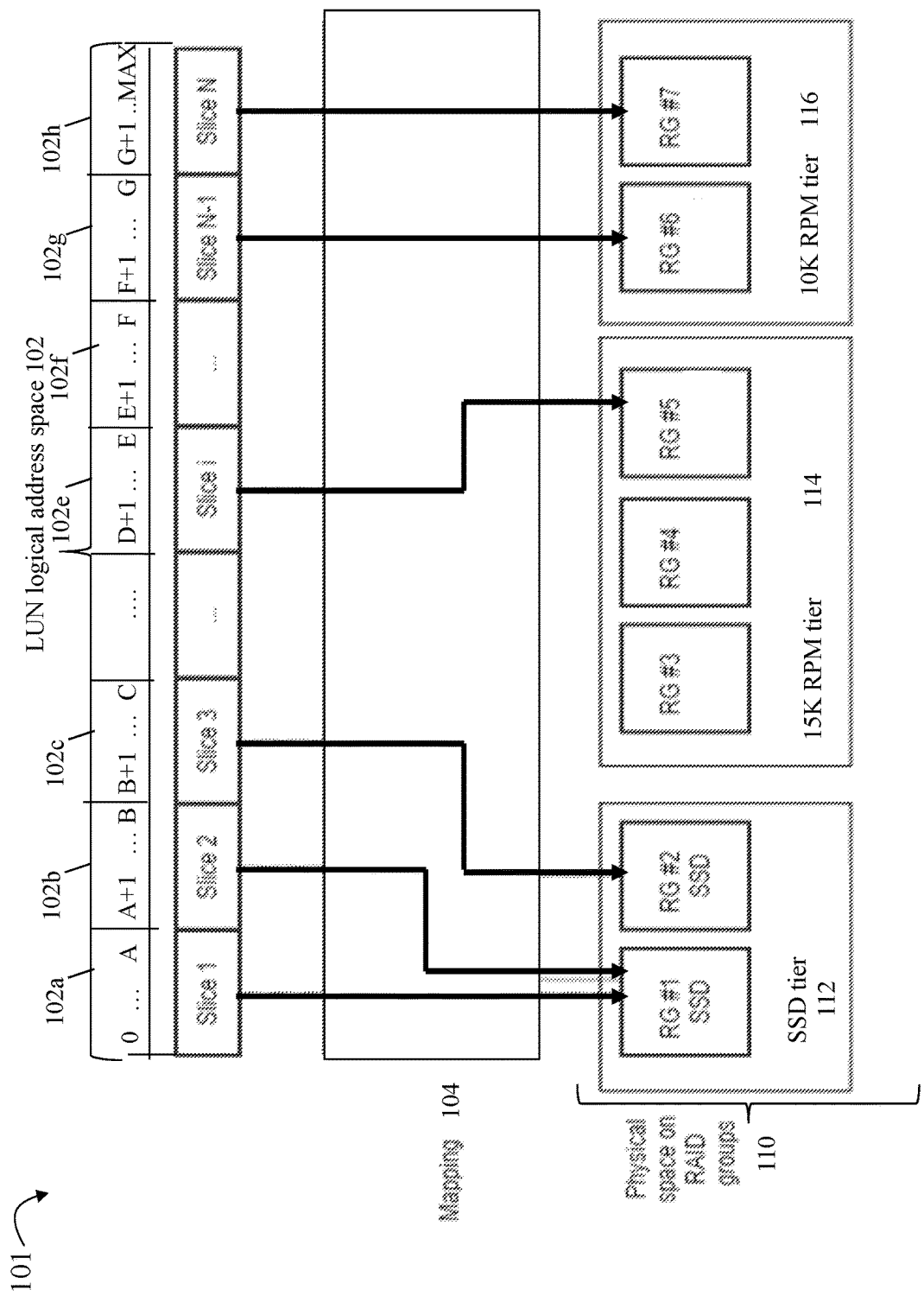
FIG. 7 is an example illustrating a mapping of a logical address space to physical storage in an embodiment in accordance with the techniques herein.

Referring to FIG. 7, shown is an example illustrating logical to physical mapping in a data storage system. The example 101 illustrates how the logical address space or range of a LUN 102 is mapped via mapping layer 104 to different slices, segments or more generally, portions of physical memory of non-volatile PDs (110) providing back-end data storage as described elsewhere herein. The example 101 include storage tiers 112 (SSD tier), 114 (15K RPM tier) and 116 (10K RPM tier) comprising the PDs 110 as noted above. In at least one embodiment, the SSD tier 112 may be a tier of SCM drives. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space by performing data movements to keep the data of the most actively used or accessed portions of 102a-n on slices, segments or physical storage portions of the highest performance tier 112 in efforts to maximum data storage system I/O performance. As shown in the particular embodiment of FIG. 7, PDs of the tiers 112, 114 and 116 may be configured into RAID groups (denoted as RG #1-7 in FIG. 7) each having a suitable RAID level to provide data protection. In at least one embodiment, the SSD tier 112 may be a tier of SCM drives. In addition to one or more tiers of rotating PDs such as 114 and 116 of FIG. 7 and a tier of SCM drives such as denoted by SSD 112, such an embodiment may also include one or more additional SSD tiers of flash-based PDs.

Described in the following paragraphs are techniques that may be used in an embodiment of a data storage system that includes an SCM tier of SCM PDs. The technique provides for promoting data, that is currently stored on a lower performance tier, to the SCM tier when the data has a sufficient level of activity. The activity of the data may be tracked while the data is stored in the cache, also sometimes referred to as the data cache herein. For data having a sufficient level of activity while the data is stored in the cache, an embodiment in accordance with the techniques herein may provide for promoting the data from the lower performance tier to the SCM tier before the data is evicted from the cache. In this case, the data may be promoted from the lower performance tier to the higher performance SCM tier without having to incur the adverse performance cost of an additional read to read the data from the lower performance tier. The data promotion may be implemented by copying the data from the cache to the SCM tier without first having to read the data from the lower performance tier and then storing the data read on the SCM tier. With SCM implemented as a storage tier, active data placement or movement may be done to relocate and promote a sufficiently active data portion to the SCM tier from a relatively lower performance tier before the data portion is evicted from the cache.

Prior to describing techniques that use SCM, a further description of SCM is initially provided in following paragraphs. SCM is generally a persistent non-volatile form of memory or storage that typically has particular characteristics. An example of SCM is 3D XPoint® memory storage jointly developed by Intel and Micron Technology Inc. In one aspect, SCM may be characterized as based on technologies that fill a gap in the storage market between dynamic RAM (DRAM) and flash-based storage devices, such as PDs of a storage tier using NAND flash media. Thus, SCM is a class of memory technology having performance characteristics that fall between DRAM and flash performance characteristics whereby DRAM (e.g., as may be used as cache memory) generally has higher performance than SCM and whereby SCM typically has higher performance than flash storage media. Generally, DRAM has much lower latency than (e.g., up to 100 times lower) and provides for significantly higher IOPS (I/Os per second) capability than SCM. However, SCM as compared to DRAM offers persistent data storage, has a higher storage density for a given die area, and is less expensive. With SCM as compared to flash media, SCM read and write speeds may be, for example, more than 10 times faster than flash media and SCM can support higher TOPS while offering comparable throughput. Furthermore, data access in flash is at the block and page levels, but SCM can be addressed at finer, smaller levels of granularity, such as at the byte, bit and/or word level. This granularity eliminates the typical requirement of flash media to erase an entire block to program it, and it also simplifies random access and wear leveling. However, the price per gigabyte (GB) of SCM may be substantially more than flash media. In addition to the 3D XPoint® memory storage product, another example of SCM is Z-SSD® memory storage product by Samsung. It should be noted that both of the foregoing are examples of SCM that provide comparable performance metrics but each is based on fundamentally different technologies. In the 3D XPoint® product, the bit storage is based on the difference in resistance of the bulk material. The Z-SSD® product however, is based on the widely used floating-gate transistors to store bits: single-level cell (SLC) and multilevel cell (MLC). Thus, SCM may be generally based on any suitable technology and not limited to one or more particular technologies. (e.g., SCM may also include memory based on phase change memory (PCM) as well as others known in the art).

In one aspect, as discussed above, SCM may be characterized in terms of its relative speed and performance compared to other forms of memory and storage in a data storage system. As another characteristic of SCM, SCM is generally addressable at finer/smaller levels of granularity, such as at the byte, bit and/or word level, for storing data (e.g., as compared to flash media which is written in larger size units, such as at the block or page level). As yet another characteristic of SCM, SCM provides for non-volatile persistent storage of data whereby the data stored in SCM is preserved during a power loss. Under high or heavy write I/O workloads, SCM performance also does not deteriorate to the same level as flash storage (e.g., SCM is not as adversely affected as flash storage in terms of performance under high or heavy write I/O workloads). SCM may also be characterized as a solid state form of memory or storage having no moving parts (e.g., as with rotating disk drives).

In at least one embodiment, the cache may be a fast form of volatile memory, such as a RAM-based or DRAM-based cache. The cache may be fast in terms of performance. A relative performance ranking may rank the cache as having a higher performance than the non-volatile SCM tier, and may rank the non-volatile SCM tier as having a higher performance than the one or more other lower performance storage tiers providing back-end non-volatile physical storage. For example, the one or more other lower performance storage tiers may include a tier of rotating PDs, such as the 10K RPM or 15K RPM PDs noted elsewhere herein. The one or more other lower performance tiers may include another lower performance SSD tier, such as a tier of flash PDs. The one or more lower performance storage tiers may include a tier of cloud-based storage where the PDs of the tier are remotely located from the PDs of the other tiers. For example, the SCM tier and the cache may be located in a first data storage system. The PDs of the cloud-based storage tier may be remotely located on one or more other data storage systems so that expected performance of such a tier may be lower than an expected performance of the SCM tier. Thus, generally, the different tiers providing the backend non-volatile storage, alone and in combination with the cache, may have a performance ranking based on expected performance to access data.

In at least one embodiment, the cache may be a volatile memory cache such as a DRAM or RAM based cache. The embodiment may also include multiple storage tiers of non-volatile backend PDs include an SCM tier and a second tier having a lower performance ranking than the SCM tier. The second tier may be a tier of rotating PDs, such as 10K RPM or 15K RPM PDs. As a variation, the second tier may be a tier of flash-based PDs. As yet another variation the second tier may be tier of flash-based PDs. Generally, the techniques herein may be used in connection with promoting data from the lower performance second tier, such as the tier of rotating PDs, to any other tier than as a higher performance than the second tier. Thus, although the SCM tier may be the higher performance tier and the lower performance second tier may be a tier of rotating PDs or flash PDs as described in following paragraphs, more generally, the techniques herein may be used with any suitable tiers of non-volatile storage having the relative performance rankings as described herein. Put another way, the techniques herein may be used to promote data from a lower performance tier to a higher performance tier, where the data promotion may be implemented by copying the data from the cache to the higher performance tier without performing additional I/Os, as part of the data promotion, that first read the data from the lower performance tier. In such a case, the data being promoted is already in the cache prior to deciding to promote the data. The decision to promote the data may be done by monitoring the activity of the data while the data is in the cache, where the data has been previously brought into the cache in connection with another operation or task and where the data is not brought into the cache responsive to the decision to promote the data.

The foregoing and other aspects of the techniques herein are described in more detail in following paragraphs. In connection with following paragraphs, reference may be made to an embodiment including backend non-volatile storage tiers including an SCM tier of SCM drives, a first lower performance tier of 15K RPM rotating PDs, and a second lower performance tier of 10K RPM rotating PDs. In such an embodiment, the tiers may be ranked, terms of relative performance from highest to lowest performance, as the SCM tier, the first lower performance tier of 15K RPM PDs, and the second lower performance tier of 10K RPM PDs. However, as discussed elsewhere herein, the techniques herein may be used in connection with any suitable one or more lower performance tiers. In such an embodiment, paragraphs below provide for applying the techniques herein in connection with promoting data from the lowest ranked performance tier of 10K RPM PDs to the SCM tier. More generally, an embodiment may apply the techniques herein for use in connection with promoting data of one or more tiers that are ranked, in terms of performance, lower than the SCM tier.

Figure 8:
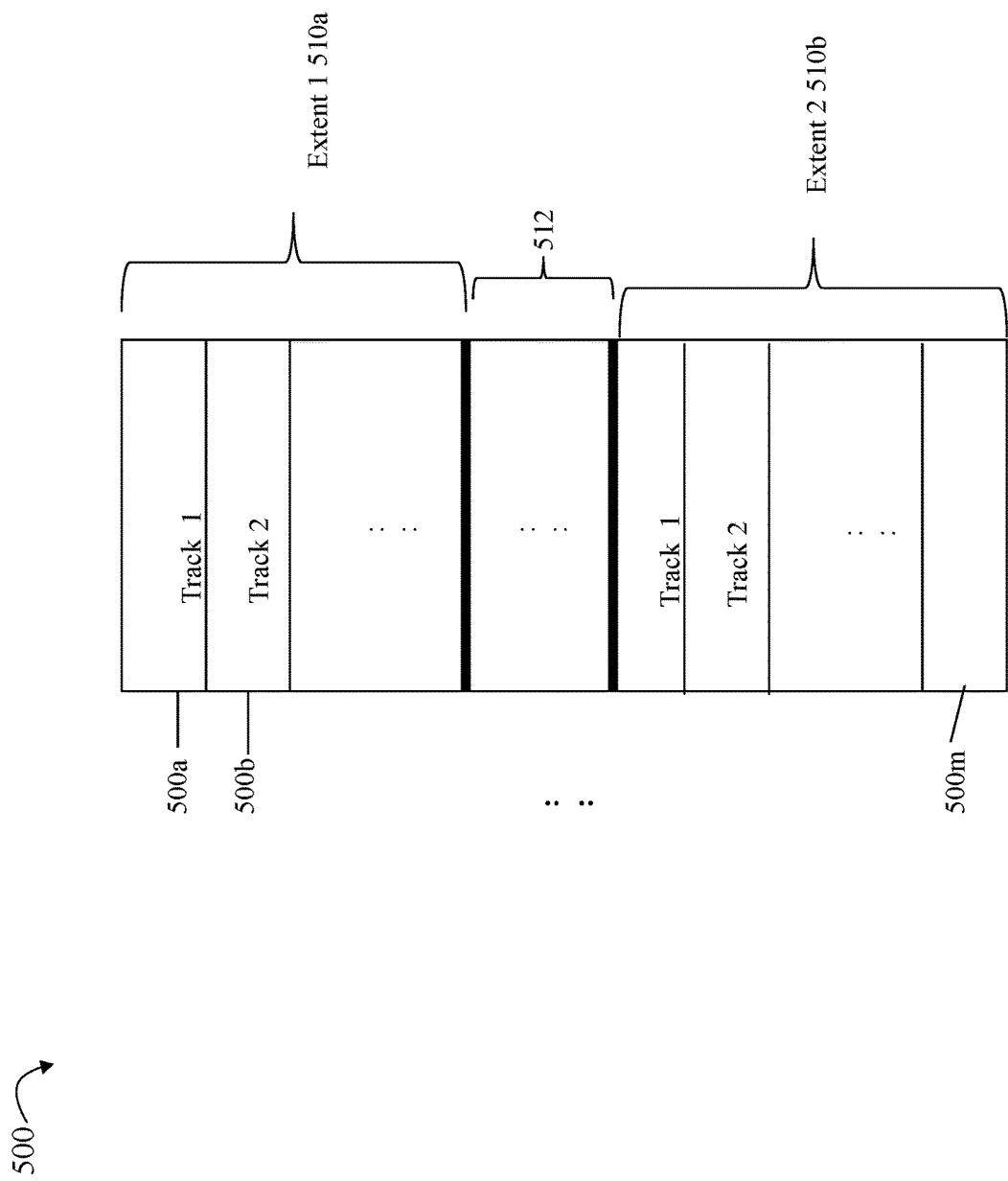

Referring to FIG. 8, shown is a representation of a cache in an embodiment in accordance with the techniques herein. The example 500 illustrates that the cache includes the cache slots or locations 500a-m. In at least one embodiment, each cache location or slot 500a-m may hold a single track of data stored in the cache. Consistent with discussion herein, the cache may generally include data that is mapped to PDs of one or more tiers of backend non-volatile storage. For example, consider an embodiment including a 10K RPM tier of 10K RPM rotating PDs, 15K RPM tier of 15K RPM rotating PDs, and an SCM tier. At this point, assume that no data has yet been promoted to the SCM tier and no data currently located in the SCM tier is currently stored in the cache 500. Assume that the cache locations 512 include data stored in both the 10K RPM tier and the 15K RPM tier, and the cache locations of 510a and 510b include data stored in only the lowest performance tier, the 10K RPM tier.

In connection with at least one embodiment in accordance with the techniques herein, some of the cache slots including data stored in the 10K RPM tier may be logically grouped into extents. In such an embodiment, the cache slots grouped into extents for use with the techniques herein may be for a portion of the data currently stored on the lowest performance 10K RPM tier. In at least one embodiment, each extent may be 8 megabytes (MB) in size and may include 64 tracks of data. The 64 tracks of data of each individual extent may be located at logically sequential cache locations. The 64 tracks of data of each individual extent may correspond to data stored at sequential contiguous logical addresses of a LUN. For example, extent 1 510a may include cached first data for data stored at an 8 MB logical address subrange of a LUN, such as LUN A, LBA 0-63, where the first data is located in the lowest performance 10K RPM tier; and extent 2 510b may include cached second data for data stored at an 8 MB logical address subrange of a LUN, such as LUN B, LBA 0-63, where the second data is located in the lowest performance 10K RPM tier. For each extent corresponding to 8 MBs of logically sequential address space of a LUN having its data located in the lowest performance 10K RPM tier, I/O statistics may be tracked for use with the techniques herein.

It should noted that, at any point in time, not all 64 cache locations of an extent may include data. It may be that only some of the cache locations actually include cached data. In such a case, the I/O statistics denoting the I/O activity of the extent may be based on those cache locations storing cached data.

In at least one embodiment, such tracking of I/O statistics for extents may not be performed for all data of the lowest performance 10K RPM tier stored in the cache. Rather, the tracking of I/O statistics may be performed for extents corresponding to a selected portion the data that is stored in the lowest performance 10K RPM tier and where the data is currently in the cache. For example, the tracking of I/O statistics may be performed for extents corresponding to the hottest or most active 10 terabytes (TBs) of logical address space of LUNs having their data stored in the lowest performance 10K RPM tier. More generally, an embodiment may select any suitable amount of data and logical address space to track using any suitable technique. Thus, generally, an embodiment may track the I/O statistics for N extents.

The I/O statistics for a single extent corresponding a sequential logical address space of a LUN may be tracked for as long as at least a single track of data of the extent is stored in the cache.

With reference to FIG. 9, shown is an example 500 of the I/O statistics 510 that may be tracked for each extent in an embodiment in accordance with the techniques herein. For each of the N extents formed from cached data currently stored in the lowest performance 10K RPM tier, the I/O statistics tracked may include an I/O count or access count 510a, an activity mask 510b, and a creation time 510c. The I/O count or access count 510a for an extent may represent the number of times that cached data of the extent is accessed.

The activity mask 510b may be a bit mask that includes a bit for each track in the extent. In the embodiment described herein where each extent includes 64 tracks, the activity mask 510b may include 64 bits, with a different bit of the mask 510b used to denote activity with respect to a corresponding one of the 64 tracks of the extent.

The creation time 510c may be a time stamp or other indicator denoting the earliest time at which data of the extent was stored in the cache. Put another way, the creation time 510c may be denote the point in time at which the first or initial track of data, that is included in the logical address space mapped to the extent, is stored in the cache. The creation time 510c may also denote the time at which the structure storing the I/O statistics is created such as when storing the first or initial track of data for the extent in the cache. The creation time 510c may be used as described elsewhere herein to calculate the consecutive amount of time data for the extent has been in the cache. For example, the creation time may be subtracted from the current time to obtain a duration time, where the duration time denotes the consecutive amount of time data for the extent has been in the cache. As an alternative, rather than store the creation time 510c, an embodiment may store the duration time in the I/O statistics for each extent.

In at least one embodiment, the memory used for storing the I/O statistics for each extent may be dynamically allocated and deallocated in accordance with whether data of the extent is currently in the cache. For example, the structure storing the I/O statistics of an extent associated with a particular 8 MB address space may be created when the initial track of data within that particular 8 MB address space is stored in the cache. In connection with the creation of the structure instance, memory may be allocated for the structure instance. In a similar manner, the structure instance may be destroyed and its associated memory deallocated responsive to evicting a last one of the data tracks of the extent from the cache, where no data of the extent remains in the cache.

The I/O count or access count 510a for an extent may be incremented each time there is an I/O operation directed to a target logical address included in the logical address range associated with the extent. Thus the I/O count indicates the number of times reads and writes are issued to a logical address in the 8 MB logical address range of extent.

In at least one embodiment, all bits of the activity mask 610b may be initialized to 0. The activity mask 610b may be updated each time there is an I/O directed to a target logical address in the logical address range associated with the extent. A particular bit of the activity mask associated with a track of the extent may be set to 1 when an I/O operation is directed to a target logical address in that track having its data stored in the cache. When a track of data associated with a particular bit of the mask 610b is evicted from the cache, the particular bit may be cleared or set to 0. Thus, when all bits of the mask 610b are 0, the memory allocated for the structure noted elsewhere herein for storing the extent's I/O statistics 610 may be deallocated.

The I/O workload captured in connection with the I/O statistics 610 of each extent may be back-end (BE) I/O workload statistics discussed elsewhere herein based on I/Os issued by the DAs to the PDs.

In connection with evaluating cached data of extents for potential promotion from the lowest performance 10K RPM tier to the SCM tier, processing may use the I/O count, 610a and the activity mask 610b for the extent's I/O statistics to determine whether the I/O count of the extent meets the following condition as denoted by EQUATION 1:

$$H(E) = \text{true or 1 if (I/O count } (E) > \text{bit\_count (activity mask}(E)))$$

$$= \text{false or 0, otherwise} \quad \text{EQUATION 1}$$

Where
E denotes the particular extent;
H(E) is a Boolean value of the heuristic having a value of 1 or true if the condition denoted by "(I/O count (E)>bit_count (activity mask(E)))" is true, and otherwise H(E) has a value of 0 or false.
activity mask(E) is the activity mask 610b of the extent E's I/O statistics; and
bit_count is a function that returns an integer value indicating the number of bits in the argument, activity mask(E), that are set to 1.

Generally, the heuristic H(E) of EQUATION 1 provides an assessment that holds true when there is more than 1 I/O per track of cached data of the extent.

In at least one embodiment, EQUATION 1 may be used as the heuristic H(E) that attempts to detect when the I/Os or accesses directed to the logical address space of an extent correspond to a logically sequential access pattern with respect to sequential logical addresses in the logical address space of the extent. If the heuristic H(E) of EQUATION 1 evaluates to true, then the heuristic H(E) determines that the I/Os or accesses directed to the logical address space of an extent do not correspond to a logically sequential access pattern with respect to sequential logical addresses in the logical address space of the extent. Otherwise, if the heuristic H(E) of EQUATION 1 evaluates to false, then the heuristic determines that the I/Os or accesses directed to the logical address space of an extent does correspond to a logically sequential access pattern with respect to sequential logical addresses in the logical address space of the extent. If the heuristic H(E) of EQUATION 1 evaluates to true for a particular extent E and its associated I/O statistics, then the extent E may be further considered as a candidate for promotion from the lower performance 10K RPM tier to the SCM tier, where the read score for the extent E may be calculated. Otherwise, if the heuristic H(E) of EQUATION 1 evaluates to false, the extent E is not further considered for the promotion. H(E) of EQUATION 1 is one example of a heuristic that may be used to provide a rough estimate as to whether the particular extent E has sequential or non-sequential accesses while data of E is in the cache.

A score may be calculated for the extent E resulting in the heuristic of EQUATION 1 evaluating to true using the I/O count, 610 and the creation time 610c of the extent's I/O statistics 610. The score may be calculated as in EQUATION 2 below:

$$\text{Score}(E) = \text{I/O count}(E)/\text{Duration}(E) \quad \text{EQUATION 2}$$

Where
E denotes the particular extent;
I/O count(E) denotes the I/O 610a count of the extent E's I/O statistics; and
Duration(E) denotes the consecutive amount of time data of the extent E has been in the cache since its creation time 610c, where Duration (E) may be calculated as in EQUATION 3 below:

$$\text{Duration}(E) = \text{Current time} - \text{Creation time}(E) \quad \text{EQUATION 3}$$

Where
Current time denotes the current date and time, such as in the form of a time stamp; and
Creation time(E) denotes the creation time 610c included in the I/O statistics for the extent E.

It should be noted that generally, an embodiment may only consider extents for promotion where the repeated accesses or I/Os as denoted to the extents are non-sequential. Use of the heuristic of EQUATION 1 is one way in which an embodiment may attempt to determine whether the accesses to the extent are non-sequential with respect to a logical address space mapped to the extent. More generally, an embodiment may use any suitable heuristic to attempt to detect when I/Os to the extent having in-cache data are non-sequential.

If the extent qualifies and meets the condition of being non-sequential, such as in accordance with the heuristic H(E) of EQUATION 1 being true, then the score for the extent may be calculated. For those extents having scores calculated, or more generally for those extents that are determined as non-sequential using the heuristic H(E) of EQUATION 1 or some other suitable heuristic, the extents may be ranked based on a sorted decreasing order of the extent scores, from the highest score to the lowest score. Extents may be considered for promotion from the lowest performance 10K RPM tier to the SCM tier based on the score ranking, from highest score to lowest score, where a first extent having a higher score than a second extent is considered for promotion prior to the second extent.

In at least one embodiment, not all qualifying extents determined as having repeated non-sequential access, such as using the heuristic H(E) of EQUATION 1, may be promoted from the lowest performance 10K RPM tier to the SCM tier. In at least one embodiment, only a particular amount of CPU time and system resources may be allocated for use in connection with performing data promotions, or more generally data movements between storage tiers. In such an embodiment, a limited number of such data movements may be performed periodically. The ranking of the extents based on the decreasing order of their scores may be used to select the highest ranked extents for movement in an attempt to maximize I/O performance gains possible with the limited number of data movements performed. Based on the extent scores, the one or more highest scores may denote the most active extents that should be promoted from the lowest performance 10K RPM tier to the SCM tier prior to other extents having lower scores.

In at least one embodiment in accordance with the techniques herein, the cache may be managed using its own cache management policies independent of the techniques herein. For example, the cache may implement any suitable eviction policy, such as a least recently used (LRU) policy. As known in the art, tracks of data may be evicted based on the last or most recent access times. In this manner, the most recently used tracks may be retained in the cache, and those tracks that are the least recently used may be evicted as new cache slots are needed for storing additional data. In at least one embodiment, the techniques herein for promoting in-cache data from the lowest performance 10K RPM tier to the SCM tier may be performed in an asynchronous manner with respect to the management and eviction processing of the cache.

Figure 10A:
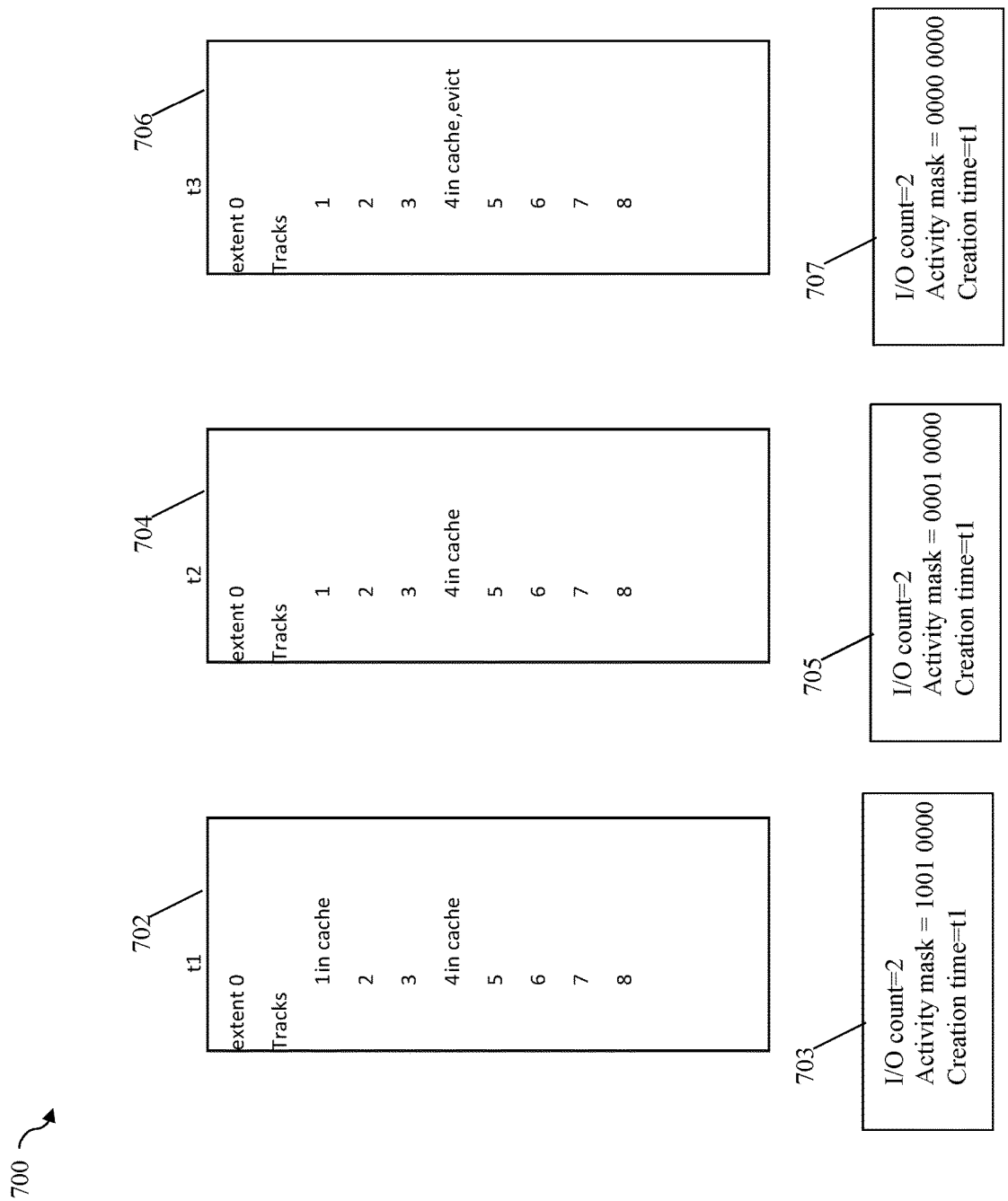
FIGS. 10A-10B are examples illustrating use of the techniques herein with cached data of an extent.

To further illustrate use of the techniques herein, reference is made to FIG. 10A. In the example 700 of FIG. 10A, a simplified representation of a single extent 0 is illustrated at 3 subsequent points in time, t1, t2 and t3, where the extent 0 has 8 tracks. The 8 tracks may be mapped to sequential logical addresses of a LUN, such as LBAs 0 through 7, where data of such LBAs is currently located in the lowest performance 10K RPM tier. At the time t1 as denoted by 702, data of tracks 1 and 4 are brought into cache. At the time t1, tracks 1 and 4 are the only data tracks of the extent 0 having data stored in the cache. Consistent with other discussion herein, data of tracks 1 and 4 may be stored in the cache responsive to receiving one or more I/Os. For example, one or more writes may write to tracks 1 and 4, and the data stored in the cache at time t1 may be the write data. As another example, one or more read I/Os may be received that read data of tracks 1 and 4, and where the requested read data of tracks 1 and 4 is not in the cache. As a result, the read I/Os result in one or more read misses. Responsive to the read misses, processing is performed to retrieve the requested read data of tracks 1 and 4 from the backend PDs of 10K RPM storage tier, and store the retrieved data needed to service the read I/Os in the cache. As yet another example, the data of tracks 1 and 4 may be stored in the cache as a result of a combination of read and write I/Os.

At the time t1, memory may be allocated for storing the I/O statistics associated with the extent 0. Also at the time t1, the I/O statistics for extent 0 may be accordingly updated as denoted by 703, where the I/O count=2 the Activity mask=1001 0000 (e.g., bits 1 and 4 are set to 1, respectively, to denote the I/Os directed to tracks 1 and 4), and the creation time=t1.

At the second point in time t2 subsequent to t1, the cache management techniques may evict track 1 data from the cache resulting in only track 4 data now remaining in the cache, as denoted by 704. Also at the time t2, the I/O statistics for extent 0 may be accordingly updated as denoted by 705, where the activity mask is updated to clear bit 1 corresponding to the evicted track 1. As indicated by the element 705, after the data of the track 1 is evicted from the cache, the I/O statistics for the extent 0 are as follows: the I/O count=2 the Activity mask=0001 0000 (e.g., only bit 4 is set to 1), and the creation time=t1.

At the third point in time t3 subsequent to t2, the cache management techniques may evict track 4 data from the cache resulting in no data of the extent 0 remaining in the cache, as denoted by 706. Also at the time t3, the I/O statistics for extent 0 may be accordingly updated as denoted by 707, where the activity mask is updated to clear bit 4 corresponding to the evicted track 4. As indicated by the element 707, after the data of the track 4 is evicted from the cache, the I/O statistics for the extent 0 are as follows: the I/O count=2 the Activity mask=0000 0000, and the creation time=t1. As a result, since no tracks of data of extent 0 are in cache, as indicated by the activity mask of 707, the storage associated with the structure storing the I/O statistics of 707 for extent 0 may be deallocated.

Figure 10B:
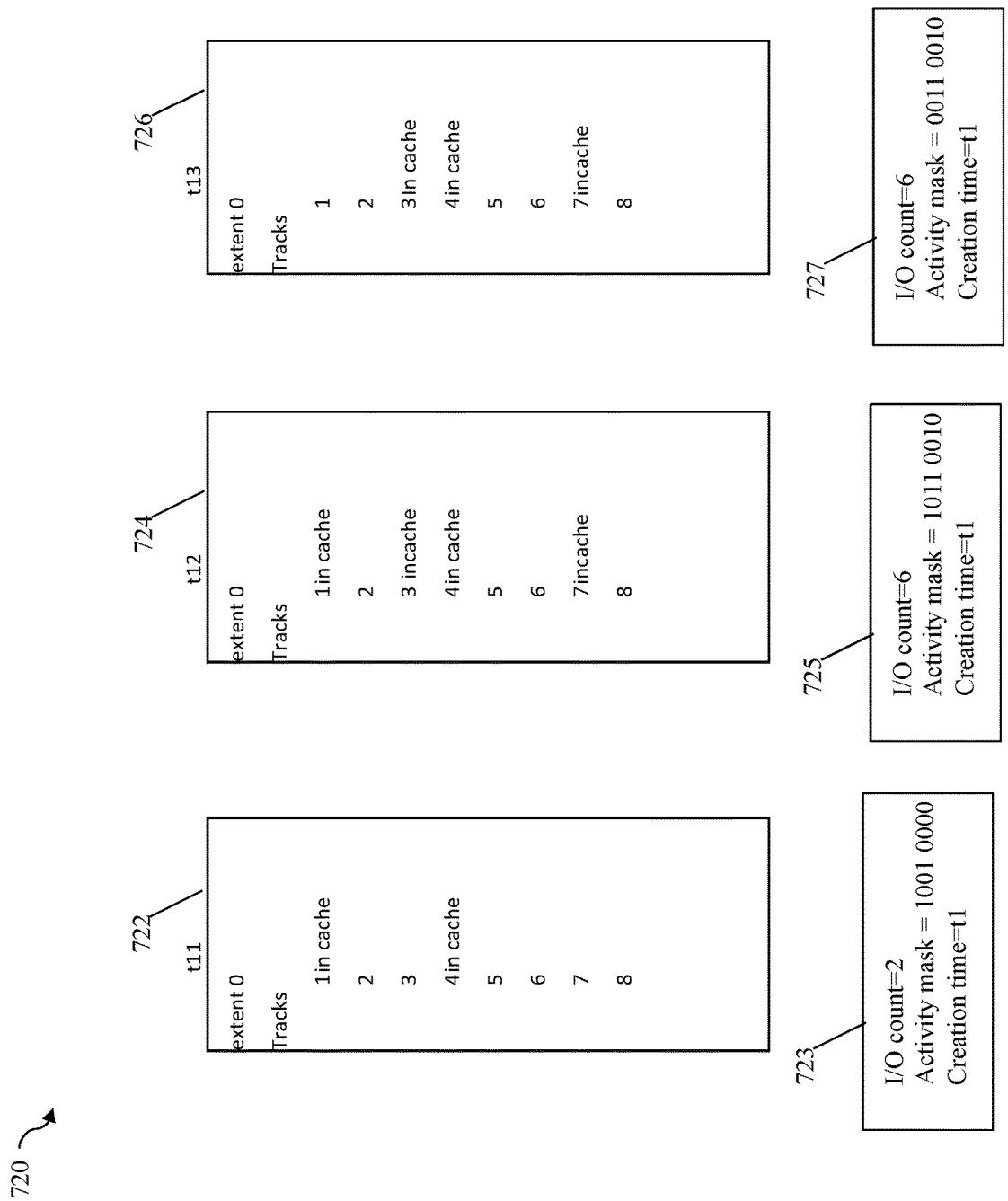

To further illustrate use of the techniques herein with another example, reference is made to FIG. 10B. In the example 720 of FIG. 10B, a simplified representation of a single extent 0 is illustrated at 3 subsequent points in time, t11, t12 and t13, where the extent 0 has 8 tracks as in the FIG. 10A. The 8 tracks may be mapped to sequential logical addresses of a LUN, such as LBAs 0 through 7, where data of such LBAs is currently located in the lowest performance 10K RPM tier. At the time t11 as denoted by 712, data of tracks 1 and 4 are brought into cache. At the time t11, tracks 1 and 4 are the only data tracks of the extent 0 having data stored in the cache. Consistent with other discussion herein, data of tracks 1 and 4 may be stored in the cache responsive to receiving one or more I/Os.

At the time t11, memory may be allocated for storing the I/O statistics associated with the extent 0. Also at the time t11, the I/O statistics for extent 0 may be accordingly updated as denoted by 723, where the I/O count=2 the Activity mask=1001 0000 (e.g., bits 1 and 4 are set to 1 respectively, to denote the I/Os directed to tracks 1 and 4), and the creation time=t1.

At the second point in time t12 subsequent to t11, 4 more read I/Os may be received directed to the tracks 1, 3, 4 and 7. As a result, read cache misses occur with respect to tracks 3 and 7 where the data for the tracks 3 and 7 is read from the back-end PDs of the 10K RPM tier and then stored in the cache. Additionally, read cache hits occur with respect to tracks 1 and 4 since data for such tracks is already in the cache. The element 724 denotes that data for the tracks 1, 3, 4 and 7 is in the cache after retrieving the data for the tracks 3 and 7. Also at the time t12, the I/O statistics for extent 0 may be accordingly updated as denoted by 725, where the activity mask is updated to ensure bits 1, 3, 4 and 7 are set respectively, to denote the I/Os directed to tracks 1, 3, 4 and 7, and where the I/O count is incremented by 4 to now indicate a total of 6. As indicated by the element 725, after the data of the tracks 3 and 7 are additionally stored in the cache, the I/O statistics for the extent 0 are as follows: I/O count=6, Activity mask=1011 0010, and Creation time=t1.

At the third point in time t13 subsequent to t12, the cache management techniques may evict track 1 data from the cache resulting in data of the tracks 3, 4 and 7 of the extent 0 remaining in the cache, as denoted by 726. Also at the time t3, the I/O statistics for extent 0 may be accordingly updated as denoted by 727, where the activity mask is updated to clear bit 1 (associated with the evicted track 1). As indicated by the element 727, after the data of the track 1 is evicted from the cache, the I/O statistics for the extent 0 are as follows: I/O count=6 Activity mask=0011 0010, and Creation time=t1.

At the fourth point in time t14 subsequent to t13, processing in accordance with the techniques herein may perform a data promotion that is a data movement of the extent with the highest ranked score. Assume that extent 0 is the highest ranked score of all qualifying extents that qualify for data movement. As discussed above, the heuristic H(E) of EQUATION 1 may be used to evaluate extent 0 to determine whether there have been repeated non-sequential I/Os issued to the extent 0. In this example, the heuristic the heuristic H(E) of EQUATION 1 evaluates to true (e.g., where the I/O count=6, and where bit_count(activity mask)=3, therefore H(Extent 0)=true since 6 is greater than 3). As such, the score for extent 0 may be determined in accordance with EQUATIONS 2 and 3 above as 2 (e.g., I/O count=6 and duration time=t14−t11=3, and assume in this example that the duration time is in seconds or some other suitable unit of time).

In connection with promotion of the extent 0 from the 10K RPM tier to the SCM tier, only the in-cache tracks at the time the promotion is performed are promoted, moved or migrated to the SCM tier. Thus, although there are 8 tracks of data in the logical address range that maps to extent 0, only the tracks 3, 4 and 7 are in the cache at the time t14 when the promotion is performed. As such, only the data of the tracks 3, 4 and 7 are promoted from the 10K RPM tier to the SCM tier. As a result of the promotion, the data of the tracks 3, 4 and 7 as stored in the cache is copied to one or more PDs of the SCM tier. Additionally, as a result of the data promotion of tracks 3, 4 and 7, the logical addresses for the corresponding LBAs 3, 4 and 7 of the LUN are now updated to map to the new physical locations in the SCM tier. As noted above, the tracks 1-8 of the extent 0 correspond respectively to LBAs 1-8 of the LUN. Prior to the promotion, mapping information maps the LBAs 1-8 to corresponding physical storage locations in the 10K RPM tier, where such physical storage locations contain the data stored at the LBAs 1-8 of the LUN. Subsequent to the promotion, the mapping information is updated to now remap the promoted data for LBAs 3, 4 and 7 corresponding physical storage locations in the SCM tier. Subsequent to the promotion, LBAs 1, 2, 5, 6 and 8 of the extent 0 are not promoted whereby the existing mapping information for LBAs 1, 2, 5, 6 and 8 is unmodified and continues to map the LBAs 1, 2, 5, 6 and 8 to their corresponding physical storage locations in the 10K RPM tier. By only promoting the in-cache tracks of data of an extent, the data promotion of the extent may be considered as an opportunistic data movement or promotion that avoids having to read the data from the source 10K RPM tier. Rather, the data promoted is obtained from the cache and stored on the target SCM tier.

As discussed elsewhere herein, promotion of in cache data for an extent from the 10K RPM tier to the SCM tier may be performed independent of the cache management of the cache. For example, as noted above in connection with the FIG. 10B, the tracks 3, 4 and 7 of the extent 0 are promoted from the 10 RPM tier to the SCM tier. After such promotion, the promoted tracks in the example of the FIG. 10B also remain in the cache. In other words, promotion to the SCM tier may not trigger or otherwise affect whether the promoted data or extent remains in the cache. A decision regarding whether particular tracks are evicted from the cache may be made independent of the promotions made to the SCM tier using the techniques herein.

Figure 11:
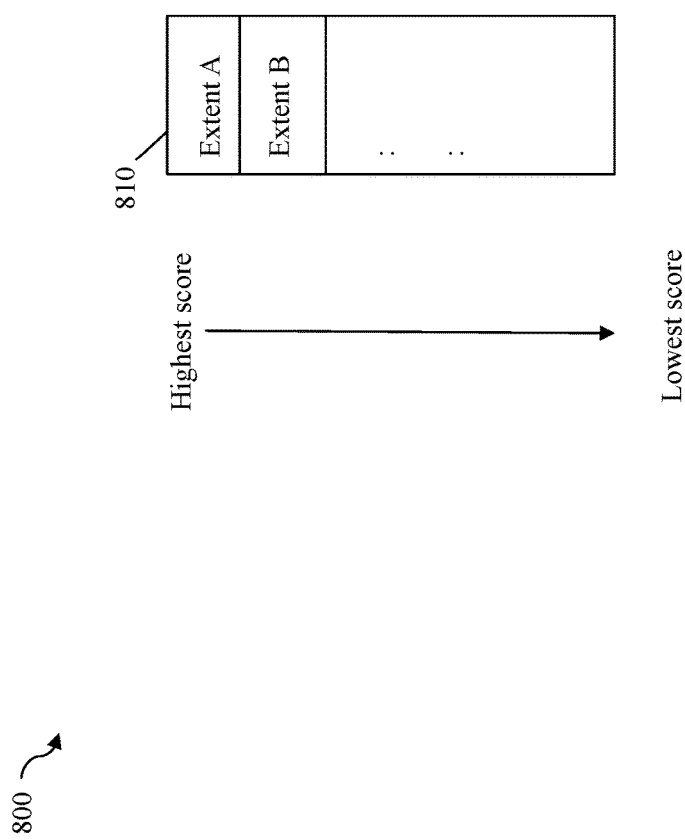
FIG. 11 is an example illustrating a sorted list of scores that may be used in an embodiment in accordance with the techniques herein.

In at least one embodiment, processing may including ranking or sorting the scores of qualifying extents determined, such as using the heuristic H(E) of EQUATION, to have repeated non-sequential accesses. As illustrated in FIG. 11, the ranking may result in a list 810 of extents. The extents or data portions may be further evaluated based on decreasing extent score. A first extent, that has a higher score than a second extent, may be considered as a data promotion candidate prior to considering the second extent as a data promotion candidate. For example, the extent A may be have a higher score than the extent B, whereby the extent A may be considered as a candidate for data movement, and in particular data promotion, prior to extent B. Consistent with discussion herein, the data movement is a data promotion to the SCM tier from a lower performance tier, such as the 10K RPM tier. In a manner as described above, the scores of the qualifying (e.g., non-sequential access) extents may be ranked, where the ranking may be from the highest extent score to the lowest extent score. The ranked extents may be considered and evaluated as described above in order to determine one or more data movements each of which is a promotion to the SCM tier from a lower performance tier, such as the 10K RPM tier. Once a particular extent is promoted, the extent may be removed from the list 810.

An embodiment may perform a variation of the processing as described above with respect to the FIG. 10B where an extent that is marked as pending promotion may temporarily block or delay an eviction of the extent's data from the cache. With reference back to FIG. 10B, track 1 of the extent 0 is evicted from the cache at the time t13 even though at the time t13, the extent 0 may be marked as pending promotion since the extent 0 has the highest extent score of all ranked extent scores. In other words, an embodiment may mark one or more extents as the next set of extents to be promoted during a next promotion period. In at least one embodiment, promotion to the SCM tier from a lower performance tier may be performed as a background process as time allows, such as during idle or low workload. As such, an embodiment may have determined the particular one or more extents to be promoted prior to the time period allocated to perform the data promotions. For example with reference to FIG. 10B, the score for the extent 0 may be ranked as the highest such score at the time t12 so the system knows at the time t12 that it will promote the extent 0 at the next subsequent point in time there is available bandwidth, such as the time t14. As such, in at least one embodiment at the time t13, extent 0 may be marked as pending promotion which may block or delay the eviction of any cached data of the marked extent 0. In this case, the pending promotion of extent 0 may block or delay the eviction of track 1 data from the cache until after the promotion of the extent 0 has been completed. In particular, the eviction of any cached data of an extent marked as pending promotion may be delayed until after the promotion of the extent. In this example with reference back to FIG. 10B, the promotion would promote the data of the tracks 1, 3, 4 and 7 of the extent 0 to the SCM tier, and then subsequently evict the track 1 data from the cache.

With reference to FIG. 11, an embodiment may maintain the ranked list of extents in an ongoing manner. The I/O statistics of the extents having data stored in the cache may be updated for every I/O operation. Each time one or more of the I/O statistics of extents are updated, the list may be reranked or resorted based on the scores of qualified extents.

In at least one embodiment in accordance with the techniques herein, data may only be promoted to the SCM tier using the techniques herein. Any suitable technique may be used in connection with further management of the SCM tier, such as in connection with determining what data is evicted from the SCM tier at different points in time and what data remains in the SCM tier at different points in time. In at least one embodiment, the data storage optimizer may perform data movements into and out of the SCM tier. The data storage optimizer may perform processing in accordance with the techniques described herein to determine when to promote data to the SCM tier from a lower performance tier, such as the 10K RPM tier. The optimizer may also perform processing to determine when to move data out of the SCM tier to another tier. For example, tracks of data, or more generally data portions of any suitable size, may be moved out of the SCM tier to a target tier as the workload of the data portions change over time. A data portion may remain in the SCM tier so long as it's workload or activity remains at a high level, such as above a specified threshold. If the data portion's workload decreases, such as below a specified threshold the data portion may be demoted and moved to a lower performance tier, such as back to the 10K RPM tier.

What will now be described are flowcharts in the FIGS. 12, 13 and 14 that summarize processing described above.

Figure 12:
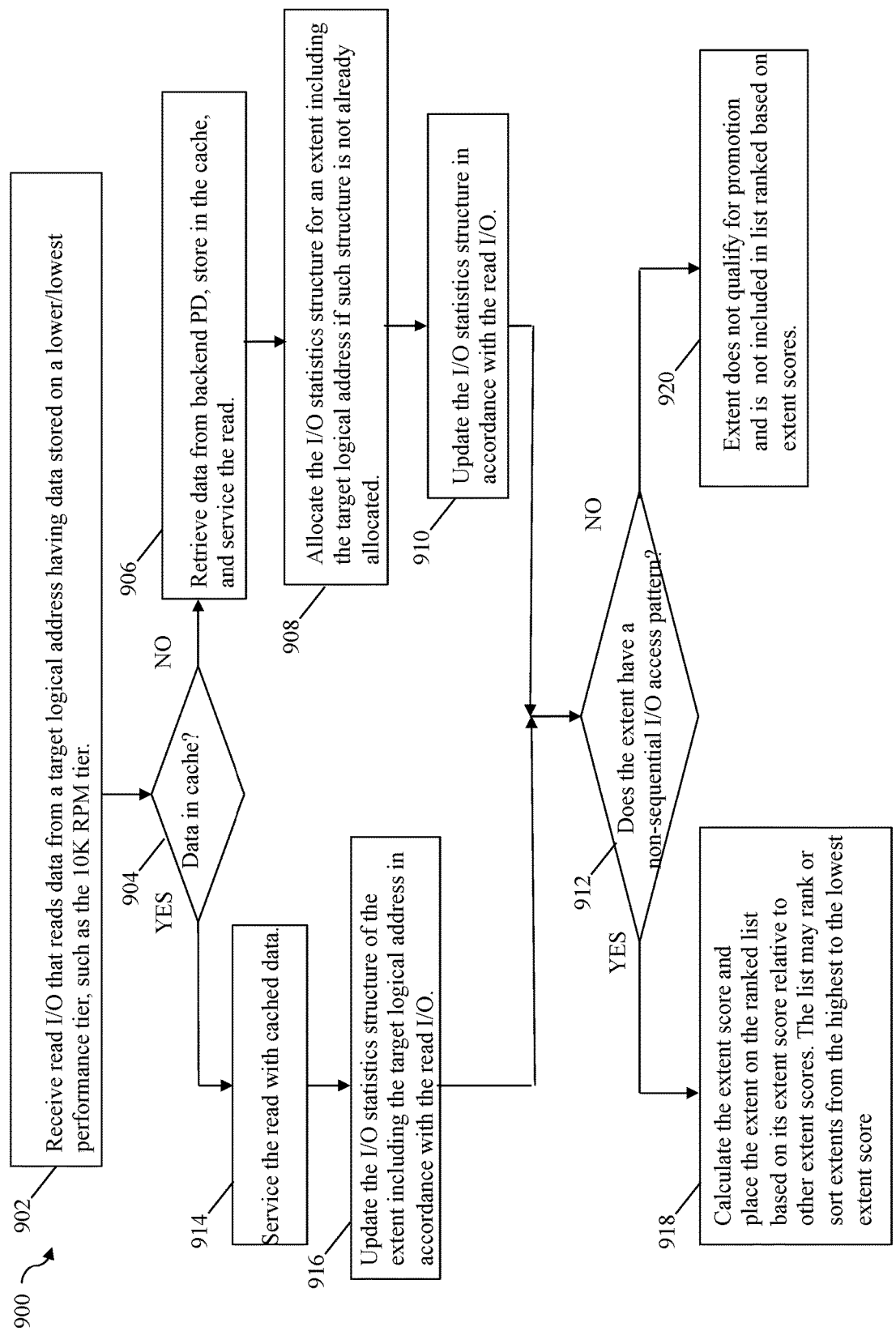
FIGS. 12, 13 and 14 are flowcharts of processing steps that may be performed in an embodiment in accordance with the techniques herein.

Referring to FIG. 12, shown is a first flowchart 900 of processing steps that may be performed in an embodiment in accordance with the techniques herein. The flowchart 900 processing may be performed in connection with processing a read I/O operation in an embodiment in accordance with the techniques herein.

At the step 902, a read I/O may be received that reads data from a target logical address having data stored on a lower/lowest performance tier, such as the 10K RPM tier. From the step 902, control proceeds to the step 904. At the step 904, a determination is made as to whether the requested read data is in the cache. If the step 904 evaluates to no, meaning that the read I/O results in a read cache miss or read miss, control proceeds to the step 906.

At the step 906, processing is performed to retrieve the requested read data from the backend PD of the lower/lowest performance tier, such as the 10K RPM tier. The retrieved data is stored in the cache and then used to service the read. From the step 906, control proceeds to the step 908. At the step 908, processing may be performed, as needed, to allocate the I/O statistics structure for the extent that includes the target logical address if such structure is not already allocated. Consistent with discussion herein, the structure may be allocated if no other data of the extent is currently in the cache. From the step 908, control proceeds to the step 910.

At the step 910, processing is performed to update, in accordance with the read I/O, the I/O statistics structure of the extent including the target logical address. The updating may include incrementing the I/O count by 1. The updating may include setting a particular bit of the activity mask, where the particular bit corresponds to the track of data including the target logical address of the read I/O operation. The updating may include initializing the creation time if the I/O statistics structure has just been allocated for the extent in the step 908. From the step 910, control proceeds to the step 912.

If the step 904 evaluates to yes, meaning that the read I/O results in a read cache hit or read hit, control proceeds to the step 914 where the read is serviced using the cached read data. From the step 914, control proceeds to the step 916. At the step 916, processing is performed to update, in accordance with the read I/O, the I/O statistics structure of the extent including the target logical address. The updating may include incrementing the I/O count by 1. The updating may include setting a particular bit of the activity mask, where the particular bit corresponds to the track of data including the target logical address of the read I/O operation. From the step 910, control proceeds to the step 912.

At the step 912, a determination is made as to whether the extent has a non-sequential I/O access pattern, such as based on the extent's I/O statistics. The determination at the step 912 may be made using any suitable heuristic, such as the heuristic H(E) described herein in connection with EQUATION 1. If the step 912 evaluates to no, control proceeds to the step 920 where the it is determined the extent does not qualify for promotion As a result, in the step 920 the extent is not included in the list of extents ranked based on their extent scores. If the step 912 evaluates to yes, control proceeds to the step 918. At the step 918, processing is performed to calculate the extent score for the extent included in the target logical address of the read I/O. The extent score may be determined, for example, using EQUATIONS 2 and 3 discussed elsewhere herein. The extent is then placed on the list of ranked extents based on the extent's score relative to the other extent scores. The list may rank or sort extents based on the extent scores, from the highest score to the lowest score.

Figure 13:
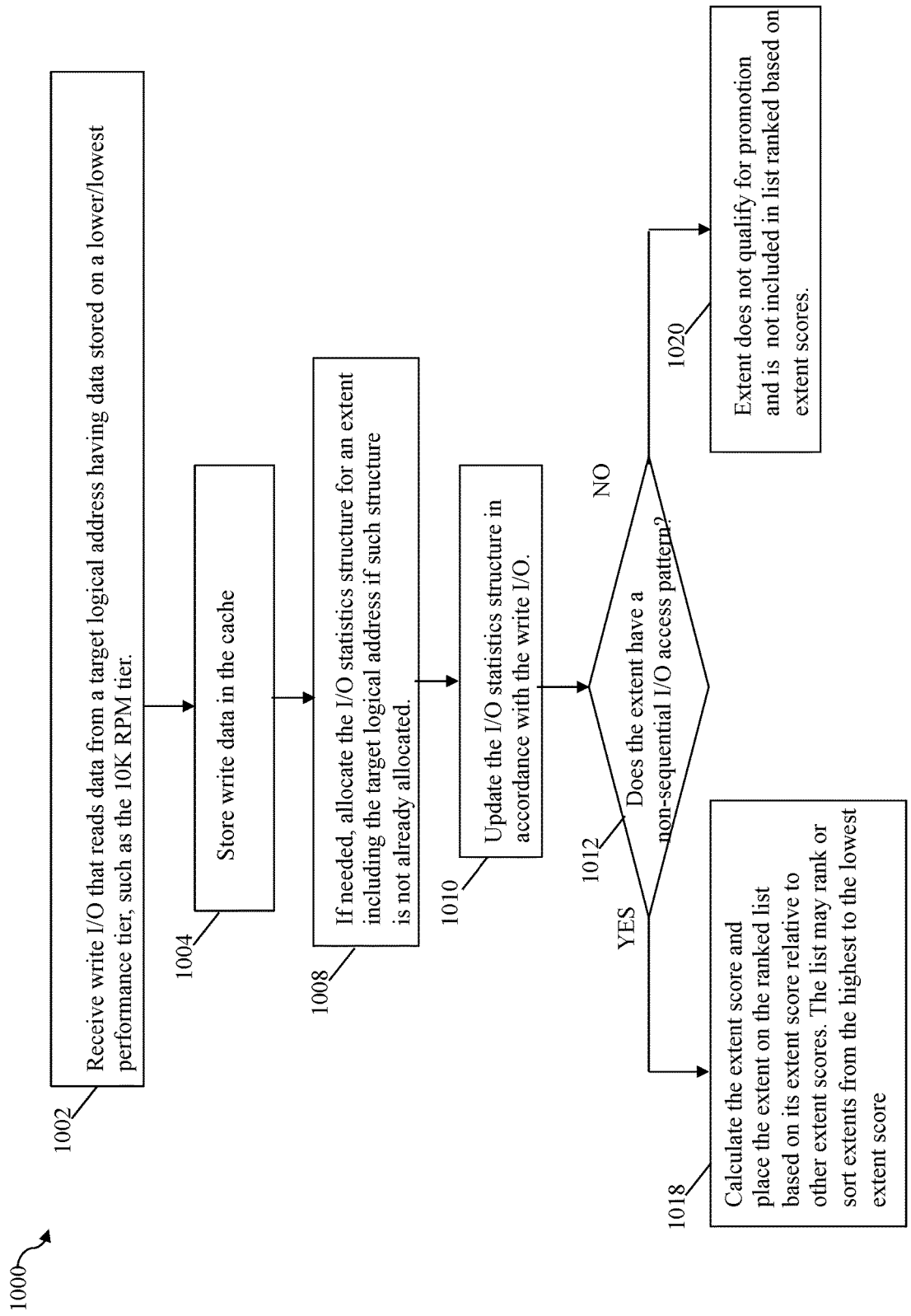

Referring to FIG. 13, shown is a second flowchart 1000 of processing steps that may be performed in an embodiment in accordance with the techniques herein. The flowchart 1000 processing may be performed in connection with processing a write I/O operation in an embodiment in accordance with the techniques herein.

At the step 1002, a write I/O may be received that writes data to a target logical address having data stored on a lower/lowest performance tier, such as the 10K RPM tier. From the step 1002, control proceeds to the step 1004 where the write data is stored in the cache. From the step 1004, control proceeds to the step 1008.

At the step 1008, processing may be performed, as needed, to allocate the I/O statistics structure for the extent that includes the target logical address if such structure is not already allocated. Consistent with discussion herein, the structure may be allocated if no other data of the extent is currently in the cache. From the step 1008, control proceeds to the step 1010. At the step 1010, processing is performed to update, in accordance with the write I/O, the I/O statistics structure of the extent including the target logical address. The updating may include incrementing the I/O count by 1. The updating may include setting a particular bit of the activity mask, where the particular bit corresponds to the track of data including the target logical address of the write I/O operation. The updating may include initializing the creation time if the I/O statistics structure has just been allocated for the extent in the step 1008. From the step 1010, control proceeds to the step 1012.

At the step 1012, a determination is made as to whether the extent has a non-sequential I/O access pattern, such as based on the extent's I/O statistics. The determination at the step 1012 may be made using any suitable heuristic, such as the heuristic H(E) described herein in connection with EQUATION 1. If the step 1012 evaluates to no, control proceeds to the step 1020 where the it is determined the extent does not qualify for promotion As a result, in the step 1020 the extent is not included in the list of extents ranked based on their extent scores. If the step 1012 evaluates to yes, control proceeds to the step 1018. At the step 1018, processing is performed to calculate the extent score for the extent included in the target logical address of the read I/O. The extent score may be determined, for example, using EQUATIONS 2 and 3 discussed elsewhere herein. The extent is then placed on the list of ranked extents based on the extent's score relative to the other extent scores. The list may rank or sort extents based on the extent scores, from the highest score to the lowest score.

Figure 14:
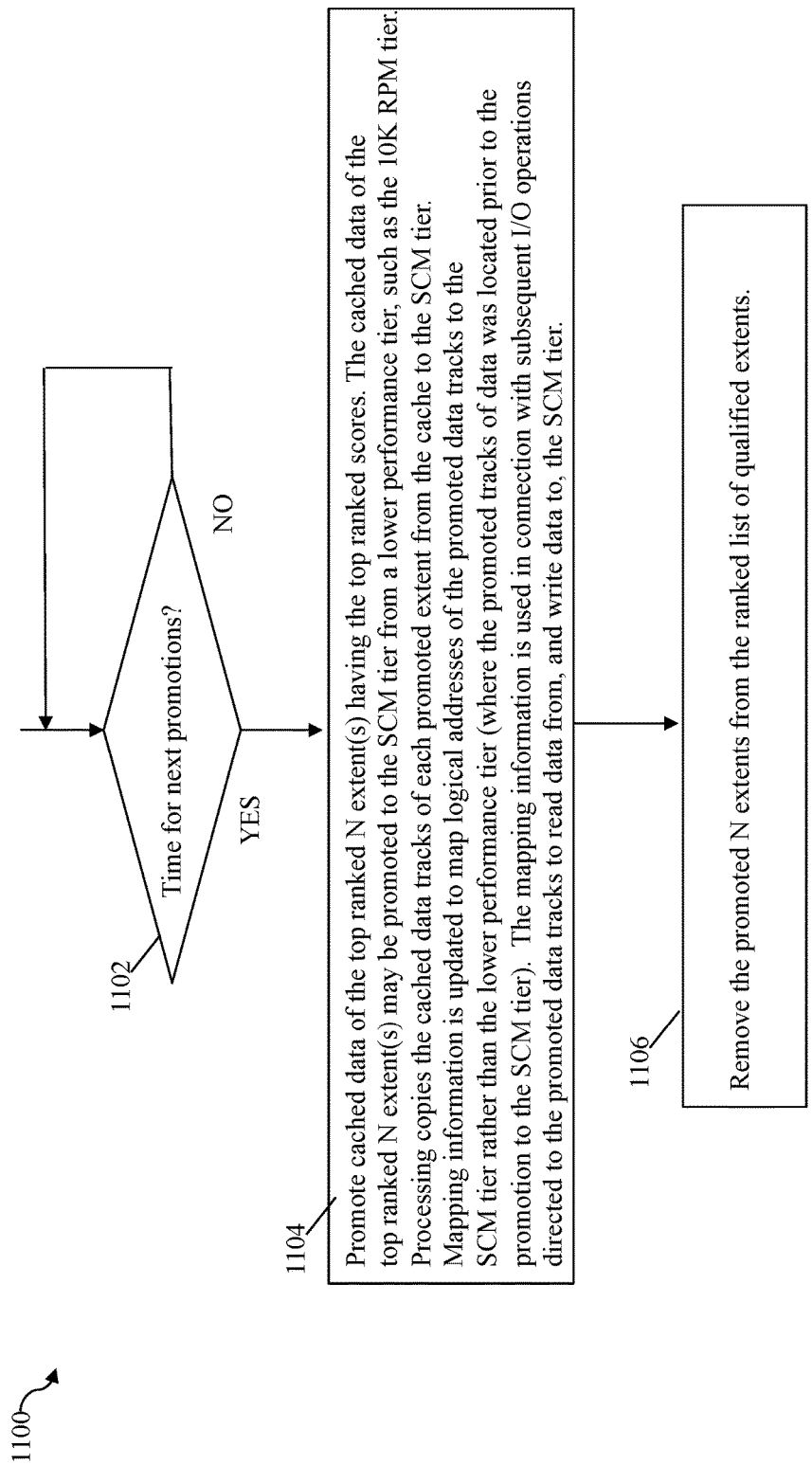

Referring to FIG. 14, shown is a third flowchart 1100 of processing steps that may be performed in an embodiment in accordance with the techniques herein. The flowchart 1100 processing may be performed in connection with promoting one or more extents to the SCM tier from a lower/lowest performance tier in an embodiment in accordance with the techniques herein.

At the step 1102, a determination is made as to whether it is time for the next set of one or more promotions to the SCM tier to be implemented. In at least one embodiment, the processing of the flowchart of FIG. 14 may be performed as a background process that periodically may perform one or more data movements. Generally, N may be an integer denoting the number of one or more extents promoted, for example, from the 10 RPM tier to the SCM tier. Control remains at the step 1102 until the step 1102 evaluates to yes. If the step 1102 evaluates to yes, control proceeds to the step 1104. At the step 1104, processing is performed to promote the cached data of the top ranked N extent(s) having the top ranked scores. The cached data of the top ranked N extent(s) may be promoted to the SCM tier from a lower performance tier, such as the 10K RPM tier. Processing includes copying the cached data tracks of each promoted extent from the cache to the SCM tier. Mapping information may also be updated to map the logical addresses of the promoted data tracks to the SCM tier rather than the lower performance tier (where the promoted tracks of data was located prior to the promotion to the SCM tier). Consistent with discussion herein, subsequent to the promotions, the mapping information may be used in connection with subsequent I/O operations directed to the promoted data tracks to read data from, and write data to, the SCM tier.

From the step 1104, control proceeds to the step 1106. At the step 1106, the N extents promoted in the step 1104 are removed from the ranked list of qualified extents.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data movements comprising:
    tracking a plurality of sets of I/O statistics for a plurality of extents, wherein each of the plurality of sets of I/O statistics characterizes I/O operations directed to a corresponding one of the plurality of extents having data stored on a first storage tier of first non-volatile storage devices;
    determining, in accordance with the plurality of sets of I/O statistics, a list that includes one or more of the plurality of extents qualified for promotion from the first storage tier to a second storage tier, wherein the second storage tier includes second non-volatile storage devices having a higher performance ranking that the first non-volatile storage devices of the first storage tier;
    selecting, from the list, a first extent to be promoted from the first storage tier to the second storage tier; and
    performing first processing that promotes only cached data of the first extent from the first storage tier to the second storage tier.

2. The method of claim 1, wherein the first processing includes:
    determining that a plurality of data portions of the first extent are currently stored in the cache;
    copying the plurality of data portions from the cache to target physical storage location in the second storage tier; and
    updating mapping information that maps a plurality of logical addresses of the plurality of data portions to the target physical storage location in the second storage tier.

3. The method of claim 2, wherein the first processing includes:
    determining that a first data portion of the first extent is not currently stored in the cache; and
    not promoting the first data portion from the first tier to the second tier.

4. The method of claim 1, wherein the list of extents includes at least two extents and the method further comprising:
    sorting the list of extents in accordance with a score associated with each of the at least two extents on the list, wherein said sorting generates a ranked list of extents sorted in decreasing order of scores associated with extents on the list.

5. The method of claim 1, wherein the first extent selected in said selecting has a highest score of all extents on the list.

6. The method of claim 4, wherein each extent on the list is a qualified extent that has been determined in accordance with a heuristic as having a non-sequential access pattern.

7. The method of claim 6, wherein the heuristic determines that said each extent has a non-sequential access pattern in accordance with one of the plurality of sets of I/O statistics associated with said each extent.

8. The method of claim 7, wherein each extent on the list has an associated score determined in accordance with one of the plurality of sets of I/O statistics associated with said each extent.

9. The method of claim 8, wherein each of the plurality of extents is partitioned into a same number of data portions, wherein each of the plurality of sets of I/O statistics associated with one of the plurality of extents includes an I/O count denoting a number of I/O operations that have been directed to said one extent, an activity mask that includes a bit for each data portion of said each extent, and a creation time denoting an earliest time at which data of said each extent is stored in the cache.

10. The method of claim 9, further comprising:
    receiving an I/O operation directed to the first extent, wherein the I/O operation reads or writes data to a target logical address mapped to the first extent; and
    updating a first set of the plurality of sets of I/O statistics corresponding to the first extent, wherein said updating includes incrementing the I/O count of the first set and setting a first bit of the activity mask corresponding to the target logical address.

11. The method of claim 1, wherein the second storage tier includes a plurality of non-volatile storage devices of storage class memory (SCM).

12. The method of claim 11, wherein the first storage tier includes a plurality of non-volatile storage devices that are rotating drives.

13. The method of claim 11, wherein the first storage tier includes a plurality of non-volatile storage devices that are solid state drives.

14. The method of claim 11, wherein a cache that caches the cached data of the first extent has a higher performance ranking than the second storage tier of SCM storage devices.

15. The method of claim 1, wherein each of the plurality of extents maps to a logical address range of a logical device and wherein, prior to performing said first processing, data of first logical address range mapped to the first extent is stored on physical storage of the first tier and after performing said first processing, data of the first logical address range mapped to the first extent is stored on other physical storage of the second tier.

16. A system comprising:
    one or more processors; and
    one or more memories comprising code stored thereon that, when executed, performs a method of performing data movements comprising:
        tracking a plurality of sets of I/O statistics for a plurality of extents, wherein each of the plurality of sets of I/O statistics characterizes I/O operations directed to a corresponding one of the plurality of extents having data stored on a first storage tier of first non-volatile storage devices;

determining, in accordance with the plurality of sets of I/O statistics, a list that includes one or more of the plurality of extents qualified for promotion from the first storage tier to a second storage tier, wherein the second storage tier includes second non-volatile storage devices having a higher performance ranking that the first non-volatile storage devices of the first storage tier;

selecting, from the list, a first extent to be promoted from the first storage tier to the second storage tier; and performing first processing that promotes only cached data of the first extent from the first storage tier to the second storage tier.

17. A computer readable medium comprising code stored thereon that, when executed, performs a method of performing data movements comprising:

tracking a plurality of sets of I/O statistics for a plurality of extents, wherein each of the plurality of sets of I/O statistics characterizes I/O operations directed to a corresponding one of the plurality of extents having data stored on a first storage tier of first non-volatile storage devices;

determining, in accordance with the plurality of sets of I/O statistics, a list that includes one or more of the plurality of extents qualified for promotion from the first storage tier to a second storage tier, wherein the second storage tier includes second non-volatile storage devices having a higher performance ranking that the first non-volatile storage devices of the first storage tier;

selecting, from the list, a first extent to be promoted from the first storage tier to the second storage tier; and performing first processing that promotes only cached data of the first extent from the first storage tier to the second storage tier.

18. The computer readable medium of claim 17, wherein the first processing includes:

determining that a plurality of data portions of the first extent are currently stored in the cache;

copying the plurality of data portions from the cache to target physical storage location in the second storage tier; and updating mapping information that maps a plurality of logical addresses of the plurality of data portions to the target physical storage location in the second storage tier.

19. The computer readable medium of claim 18, wherein the first processing includes:

determining that a first data portion of the first extent is not currently stored in the cache; and not promoting the first data portion from the first tier to the second tier.

20. The computer readable medium of claim 17, wherein the list of extents includes at least two extents and the method further comprising:

sorting the list of extents in accordance with a score associated with each of the at least two extents on the list, wherein said sorting generates a ranked list of extents sorted in decreasing order of scores associated with extents on the list, and wherein the first extent selected in said selecting has a highest score of all extents on the list.

* * * * *